US009563528B2

(12) United States Patent
Ahn et al.

(10) Patent No.: US 9,563,528 B2
(45) Date of Patent: Feb. 7, 2017

(54) MOBILE APPARATUS AND LOCALIZATION METHOD THEREOF

(71) Applicant: SAMSUNG ELECTRONICS CO., LTD., Suwon-si (KR)

(72) Inventors: Sung Hwan Ahn, Seongnam-si (KR); No San Kwak, Suwon-si (KR); Kyung Shik Roh, Seongnam-si (KR); Suk June Yoon, Seoul (KR); Seung Yong Hyung, Yongin-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 183 days.

(21) Appl. No.: 13/723,459

(22) Filed: Dec. 21, 2012

(65) Prior Publication Data

US 2013/0166137 A1    Jun. 27, 2013

(30) Foreign Application Priority Data

Dec. 23, 2011    (KR) .......................... 10-2011-0141334

(51) Int. Cl.
    *G06F 11/30*    (2006.01)
    *G05D 1/02*    (2006.01)

(52) U.S. Cl.
    CPC .............. *G06F 11/30* (2013.01); *G05D 1/027* (2013.01); *G05D 1/0246* (2013.01);
(Continued)

(58) Field of Classification Search
    CPC .............. G05D 2201/0217; G05D 2201/0216; G05D 1/0255; G05D 1/0265; G05D 1/0272; G05D 1/0274; G05D 1/027; G05D 1/0246; G06F 11/30; G06F 11/3058; G06F 3/0304; G01C 21/165; G01S 5/163
(Continued)

(56) References Cited

U.S. PATENT DOCUMENTS 7,337,040 B2 *    2/2008    Takenaka et al. ............ 700/245
7,689,321 B2 *    3/2010    Karlsson ...................... 700/253
(Continued)

FOREIGN PATENT DOCUMENTS

JP    H0914962 A    1/1997
JP    2008065562 A    3/2008
(Continued)

OTHER PUBLICATIONS

Pablo Guerrero and Javier Ruiz-del-Solar: Improving Robot Self-localization Using Landmarks' Poses Tracking and Odometry Error Estimation, 2008 (U. Visser et al. (Eds.): RoboCup 2007, LNAI 5001, pp. 148-158).*
(Continued)

*Primary Examiner* — Adam Tissot
*Assistant Examiner* — Aaron Smith
(74) *Attorney, Agent, or Firm* — Harness, Dickey & Pierce, P.L.C.

(57) ABSTRACT

A mobile apparatus and a localization method thereof which perform localization of the mobile apparatus using a distributed filter system including a plurality of local filters independently operated and one fusion filter integrating results of localization performed through the respective local filters, and additionally apply accurate topological absolute position information to the distributed filter system to improve localization performance (accuracy, convergence and speed in localization, etc.) of the mobile apparatus on a wide space. The mobile apparatus includes at least one sensor, at least one first distribution filter generating current relative position information using a value detected by the at least one sensor, at least one second distribution filter generating current absolute position information using the value detected by the at least one sensor, and a fusion filter integrating the relative position information and the absolute position information to perform localization.

22 Claims, 13 Drawing Sheets

(52) U.S. Cl.
CPC ....... *G05D 1/0272* (2013.01); *G06F 11/3013* (2013.01); *G05D 1/0274* (2013.01); *G05D 2201/0217* (2013.01); *G06F 11/3058* (2013.01)

(58) Field of Classification Search
USPC .................................. 701/23; 700/245, 253
See application file for complete search history.

(56) References Cited

U.S. PATENT DOCUMENTS

| 8,265,817 B2 * | 9/2012 | Tener et al. ..................... 701/23 |
| 2010/0010741 A1 | 1/2010 | Tener et al. |

FOREIGN PATENT DOCUMENTS

| JP | 2009-52940 | 3/2009 |
| JP | 2011175393 A | 9/2011 |
| KR | 10-2009-0092366 | 9/2009 |

OTHER PUBLICATIONS

Louis Drolet, Francois Michaud, and Jean Cote: Intelligent Robots and Systems, 2000. Meeting Date:Oct. 31, 2000-Nov. 5, 2000 (IROS 2000). Proceedings. 2000 IEEE/RSJ International, pp. 1434-1439 vol. 2.*
Japanese Office Action dated Oct. 4, 2016 for corresponding JP Application No. 2012-280327.
Kagami and Ishikawa, *An Architectural Perspective on Information Processing in Sensor Networks*; vol. 188-A, pp. 1401-1412 (2005).

* cited by examiner

MOBILE APPARATUS AND LOCALIZATION METHOD THEREOF

CROSS-REFERENCE TO RELATED APPLICATIONS

This application claims the priority benefit of Korean Patent Application No. 10-2011-0141334, filed on Dec. 23, 2011 in the Korean Intellectual Property Office, the disclosure of which is incorporated herein by reference.

BACKGROUND

1. Field

Embodiments of the present disclosure relate to a localization method in which the position of a mobile apparatus is estimated using information detected through a plurality of sensors installed in the mobile apparatus.

2. Description of the Related Art

Localization is technique which allows a mobile apparatus itself to have space perception ability and becomes a key in implementation of an autonomous mobile function of implementation of augmented reality (AR) of the mobile apparatus. Here, the mobile apparatus includes a mobile robot (a robot cleaner or a walking robot) which has sensors corresponding to human eyes and having a detection function like a computer and thus autonomously travels without human manipulation, and a mobile device (a mobile communication device, such as a mobile phone) which does not have an autonomous mobile function but has a small size to allow a user to manipulate the device in hand and thus to carry and manipulate the device while moving.

Most localization technologies have been developed in the field of mobile robots having wheels. These technologies have a single filter structure using a Kalman filter or a particle filter as a key algorithm and are implemented through a simultaneous localization and mapping (SLAM) method. The position of a mobile robot is estimated by repeatedly performing a prediction step and an update step. In the prediction step, the position of the mobile robot in the next step is predicted using a robot motion model, and in the update step, position information of the mobile robot predicted using information of sensors is updated.

In the localization technologies, research regarding sensor fusion in which image sensors such as cameras or distance sensors such as laser sensors, ultrasonic sensors, etc., are installed in a robot main body and pieces of information acquired through the respective sensors are simultaneously processed, has been mainly developed. The robot simultaneously estimates position information of the robot and landmarks using feature points extracted from image information acquired through the cameras or corners, walls or a lattice map acquired through distance information detected through the laser sensors as natural landmarks.

In general, when localization through multiple sensor fusion is implemented, as the number of sensors increases, accuracy in localization is improved. In the conventional localization technologies having a single filter structure, as the number of sensors increases, the structure and implementation process of the filter become complicated, calculated information is concentrated on only one filter and thus information processing load of the filter increases. Particularly, in the update step, since the amount of measurement information increases in proportion to the number of mounted sensors, the amount of calculation of the filter increases and the operation speed of the filter decreases.

Further, in the case of the single filter structure, if the filter malfunctions or defective sensor information is input, there is no method to prevent such a defect and thus the filter is sensitive to disturbance. Consequently, a result of localization of the robot is easily diverged. In general, when the estimated value of the filter is diverged even once, it may be difficult to recover the original function of the filter, and if localization of the robot using image information is performed, the original function of the filter may be recovered using a separate technology named kidnap recovery but a calculation and implementation process may be complicated.

SUMMARY

Therefore, it is an aspect of the present disclosure to provide a mobile apparatus and a localization method thereof which perform localization of the mobile apparatus using a distributed filter system including a plurality of local filters independently operated and one fusion filter integrating results of localization performed through the respective local filters, and additionally apply accurate topological absolute position information to the distributed filter system to improve localization performance such as accuracy and convergence in localization of the mobile apparatus such as a traveling robot, a walking robot or a portable mobile device on a wide space.

Additional aspects of the disclosure will be set forth in part in the description which follows and, in part, will be apparent from the description, or may be learned by practice of the disclosure.

In accordance with one aspect of the present disclosure, a mobile apparatus includes at least one sensor, at least one first distribution filter generating current relative position information using a value detected by the at least one sensor, at least one second distribution filter generating current absolute position information using the value detected by the at least one sensor, and a fusion filter integrating the relative position information of the at least one first distribution filter and the absolute position information of the at least one second distribution filter to perform localization.

The at least one second distribution filter may generate the absolute position information through detection of at least one node predetermined on a space on which the mobile apparatus moves.

The at least one second distribution filter may include a prediction unit predicting position/pose information of the mobile apparatus and an update unit updating the predicted position/pose information of the mobile apparatus using the value detected by the at least one sensor, and the at least one second distribution filter may provide the updated position/pose information to the fusion filter to reflect the updated position/pose information in update of position/pose information of the fusion filter.

Prediction of the position/pose information may be periodically performed, and update of the position/pose information may be performed whenever the at least one node is detected.

The at least one first distribution filter may reflect the fused position/pose information of the fusion filter in update of the relative position information, and the at least one second distribution filter may reflect the fused position/pose information in update of the absolute position information.

The mobile apparatus may further include a preprocessing unit recognizing at least one node predetermined on a space on which the mobile apparatus moves, generating node detection information from which uncertainty of node detection is removed through comparison between a node recognition result and a predetermined local map, and providing the node detection information to the at least one second distribution filter.

The preprocessing unit may include a node recognition unit to recognize the at least one node and a node matching unit to remove uncertainty of node detection.

The mobile apparatus may further include a storage unit to store the local map.

The at least one sensor may be a camera to photograph a space on which the mobile apparatus moves.

In accordance with another aspect of the present disclosure, a localization method of a mobile apparatus includes allowing at least one first distribution filter to generate current relative position information using a value detected by at least one sensor, allowing at least one second distribution filter to generate current absolute position information using the value detected by the at least one sensor, and allowing a fusion filter to fuse the relative position information of the at least one first distribution filter and the absolute position information of the at least one second distribution filter to perform localization.

The at least one second distribution filter may generate the absolute position information through detection of at least one node predetermined on a space on which the mobile apparatus moves.

The at least one second distribution filter may include a prediction unit predicting position/pose information of the mobile apparatus and an update unit updating the predicted position/pose information of the mobile apparatus using the value detected by the at least one sensor, and the at least one second distribution filter may provide the updated position/pose information to the fusion filter to reflect the updated position/pose information in update of position/pose information of the fusion filter.

Prediction of the position/pose information may be periodically performed, and update of the position/pose information is performed whenever the at least one node is detected.

The at least one first distribution filter may reflect the fused position/pose information of the fusion filter in update of the relative position information, and the at least one second distribution filter may reflect the fused position/pose information in update of the absolute position information.

The localization method may further include allowing a preprocessing unit to recognize at least one node predetermined on a space on which the mobile apparatus moves, to generate node detection information from which uncertainty of node detection is removed through comparison between a node recognition result and a predetermined local map, and to provide the node detection information to the at least one second distribution filter.

The preprocessing unit may include a node recognition unit to recognize the at least one node and a node matching unit to remove uncertainty of node detection.

The localization method may further include storing the local map in a storage unit.

The at least one sensor may be a camera to photograph a space on which the mobile apparatus moves.

According to another aspect of one or more embodiments, there is provided at least one non-transitory computer readable medium storing computer readable instructions to implement methods of one or more embodiments.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Figure 1:
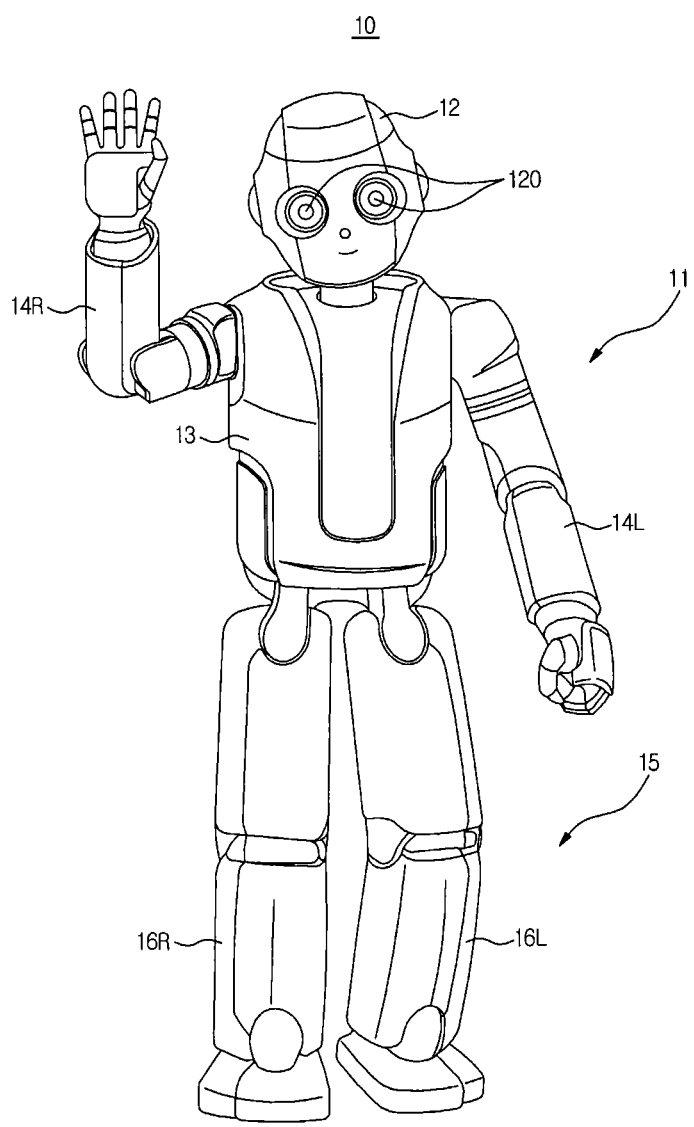
FIG. 1 is a view illustrating the external appearance of a walking robot as one example of a mobile apparatus in accordance with an embodiment of the present disclosure.

Reference will now be made in detail to embodiments of the present disclosure, examples of which are illustrated in the accompanying drawings, wherein like reference numerals refer to like elements throughout.

FIG. 1 is a view illustrating the external appearance of a walking robot as one example of a mobile apparatus in accordance with an embodiment of the present disclosure.

As shown in FIG. 1, a walking robot 10 as one example of a mobile apparatus in accordance with an embodiment of the present disclosure is a bipedal walking robot walking upright by two legs 16L and 16R in the same manner as a human, and includes an upper body 11 including a head 12, a torso 13 and two arms 14L and 14R, and a lower body 15 including the two legs 16L and 16R. Cameras 120 photographing an area around a space on which the walking robot 10 moves are installed in portions of the head 12 having the shape of human eyes.

Herein, "L" and "R" added to reference numerals denote the left side and the right side of the walking robot 10, respectively.

Although this embodiment of the present disclosure describes the bipedal walking robot as one example of a mobile apparatus, embodiments of the present disclosure may be applied to mobile robots having various shapes, such as a cleaner robot in homes, a service robot for public places, a transfer robot on a manufacturing line, a worker supporting robot, etc., and a mobile device (a mobile communication device, such as a mobile phone) which does not have an autonomous mobile function but allows a human to carry and manipulate the device while moving.

Figure 2:
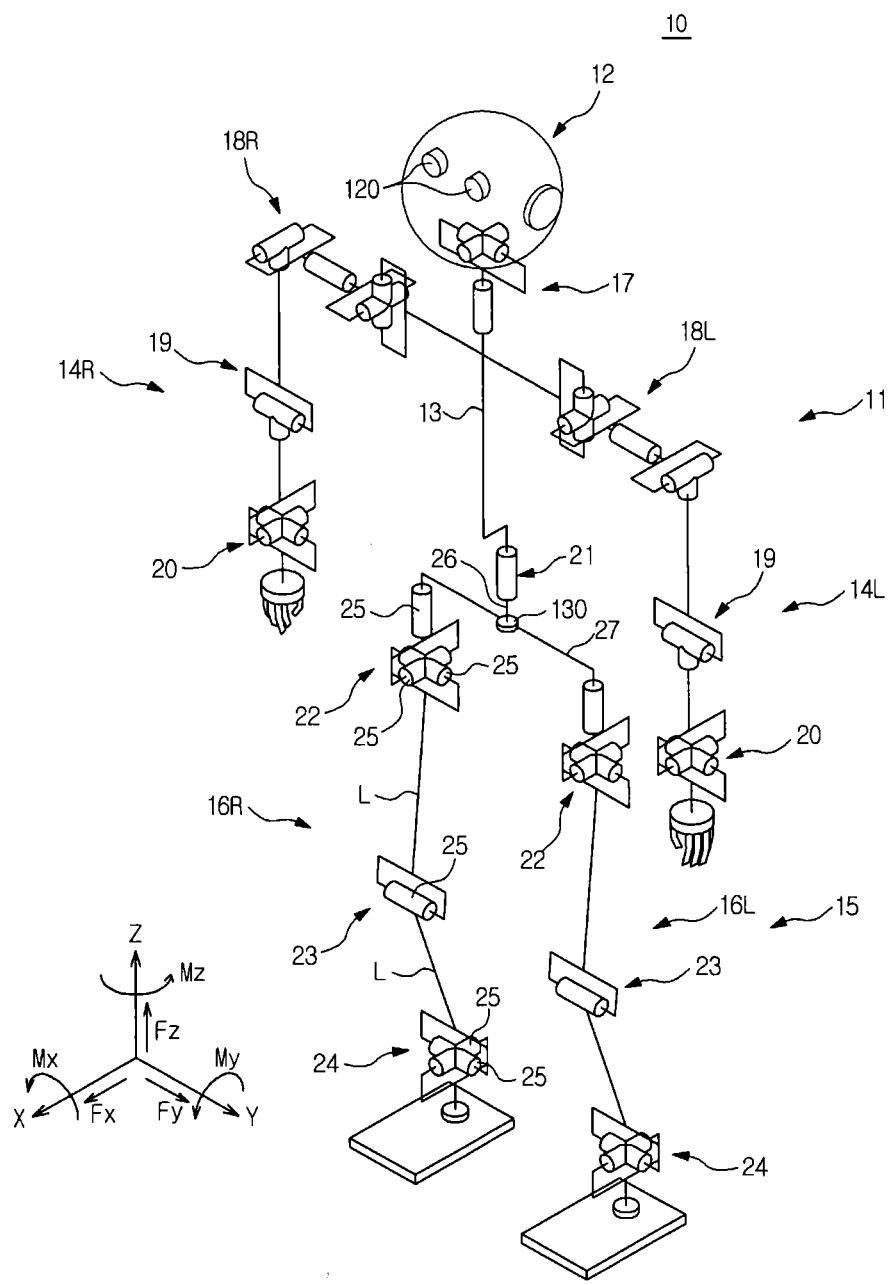
FIG. 2 is a view illustrating main mechanism and joint structures of the walking robot shown in FIG. 1.

FIG. 2 is a view illustrating main mechanism and joint structures of the walking robot shown in FIG. 1.

As shown in FIG. 2, the cameras 120 photographing an area around the space on which the walking robot 10 moves are installed on the head 12 of the walking robot 10.

The head 12 is connected to the torso 13 of the upper body 11 through a neck joint unit 17. Plural joint units, i.e., shoulder joint units 18, elbow joint units 19, wrist joint units 20, a waist joint unit 21, hip joint units 22, knee joint units 23 and ankle joint units 24, are installed on the torso 13, the two arms 14L and 14R and the two legs 16L and 16R. The respective joint units 18, 19, 20, 21, 22, 23 and 24 include one to three rotary joints 25 according to degrees of freedom (the numbers of directions in which the joint units move). For example, the hip joint unit 22 includes a rotary joint 25 in the yaw direction (rotated about the Z-axis), a rotary joint 25 in the pitch direction (rotated about the Y-axis) and a rotary joint 25 in the roll direction (rotated about the X-axis), and thus has 3 degrees of freedom. The respective joint units 18, 19, 20, 21, 22, 23 and 24 are connected by links L (shown by the straight line of FIG. 2).

A pelvis 26 supporting the upper body 11 is connected to the waist joint unit 21 installed at the lower portion of the upper body 11. The pelvis 26 is connected to the hip joint units 22 through a pelvis link 27. An initial measurement unit (IMU) 130 to detect pose information (angle information) of the walking robot 10 is installed at the pelvis link 27. The IMU 130 detects relative angles of the pelvis link 27 to the gravity direction and the inertial system, and thus generates pose information (angle information) in the roll direction, the pitch direction and the yaw direction. Such an IMU 130 may be installed on the torso 13 or the head 12 as well as on the pelvis link 27.

Although not shown in FIG. 2, actuators (corresponding to driving units of FIG. 3), such as motors driving the respective rotary joints 25 by power (electricity or hydraulic pressure), and encoders 110 (in FIG. 3) detecting rotating angles of the respective actuators, i.e., rotating angles of the respective rotary joints 25, are installed on each of the respective joint units 18, 19, 20, 21, 22, 23 and 24 of the walking robot 10. A controller 200 (in FIG. 3) controlling the overall operation of the walking robot 10 properly controls these actuators, thereby allowing the walking robot 10 to execute various motions.

Figure 3:
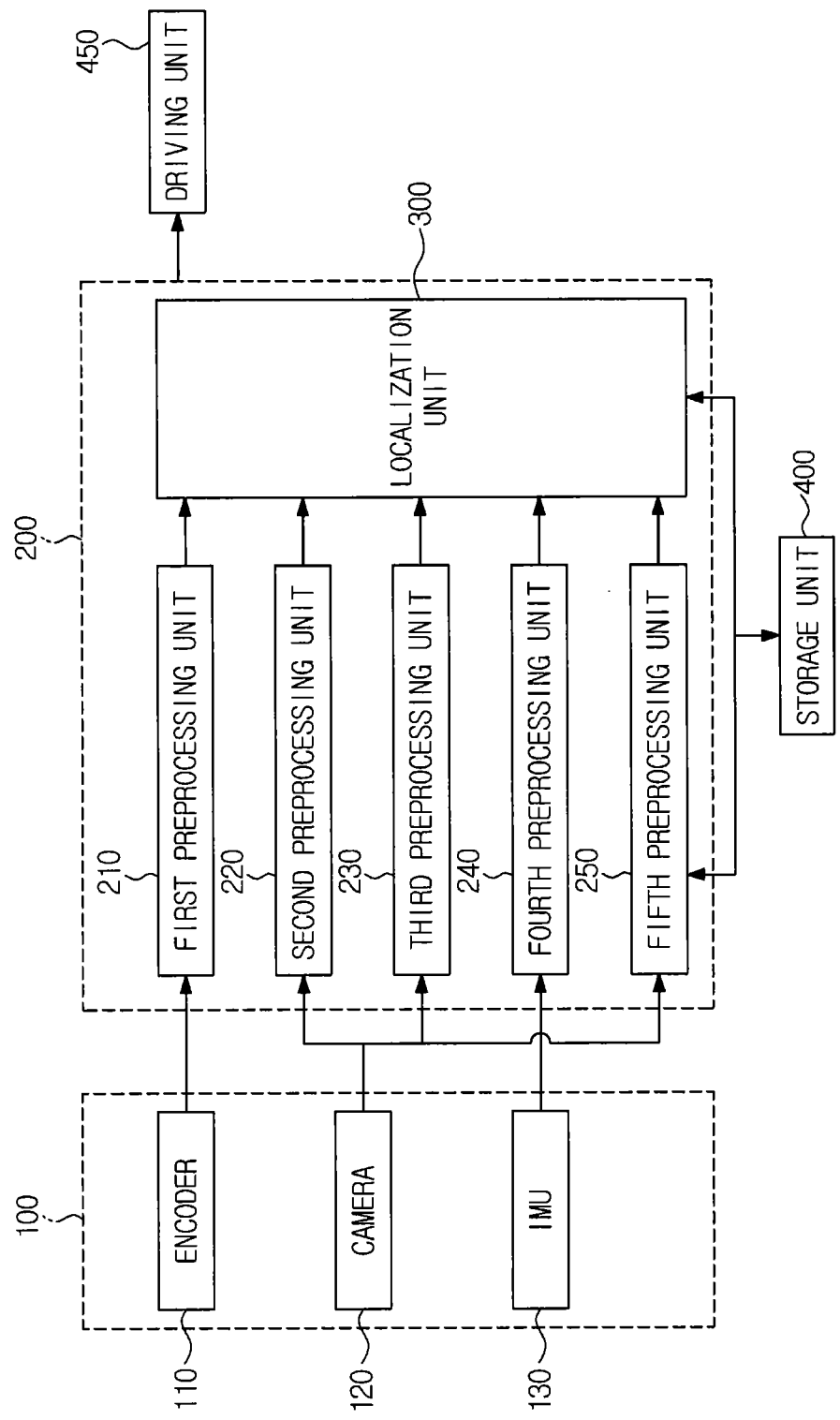
FIG. 3 is a block diagram illustrating a control system of the walking robot shown in FIG. 1.

FIG. 3 is a block diagram illustrating a control system of the walking robot shown in FIG. 1.

As shown in FIG. 3, the control system of the walking robot 10 as one example of a mobile apparatus in accordance with an embodiment of the present disclosure includes a sensor module 100, the controller 200, a storage unit 400 and driving units 450.

The sensor module 100 includes a plurality of sensors 110, 120 and 130 to detect information regarding the walking robot 10 and information regarding a space on which the walking robot 10 moves. The sensor module 100 may include various sensors, i.e., the encoders 110 to acquire information of rotating angles of the rotary angles regarding walking of the walking robot 10, the cameras 120 to photograph an area around the space on which the walking robot 10 walks, and the IMU 130 to detect pose information (angle information) of the walking robot 10.

In the sensor module 100, the encoders 110 detect rotating angles of the actuators (the driving units) installed to rotate the respective rotary joints 25 provided on the hip joint units 22, the knee joint units 23 and the ankle joint units 24.

In the sensor module 100, the cameras 120 acquire image information around the space on which the walking robot 10 moves by detecting light reflected by a subject for photography and converting the detected light into a digital signal.

As the cameras 120, charge-coupled device (CCD) cameras, complementary metal oxide semiconductor (CMOS) cameras and time of flight (TOF) cameras may be used, and any device which may acquire image information of an object located on a walking route of the walking robot 10 may be used. Further, the cameras may have night vision capabilities so that the images may be acquired even when there is little or no light. For example, the cameras may be infrared or thermal imaging cameras. With night vision capabilities, the walking robot may be able to walk even under the condition that there is little or no light.

In the sensor module 100, the IMU 130 serves to measure various pieces of information regarding navigation, such as velocity, acceleration and directions and angles of the walking robot 10, and measures tilts and rotating angles of the pelvis link 27 in the roll direction, the pitch direction and the yaw direction. The IMU 130 includes tilt sensors measuring angles of the walking robot 10 and angular velocity sensors measuring angular velocities of the walking robot 10. Here, the tilt sensor employs an accelerometer, and the angular velocity sensor employs a rate-gyroscope.

The controller 200 controls the overall operation of the walking robot 10, and includes first to fifth preprocessing units 210 to 250, and a localization unit 300.

The first to fifth preprocessing units 210 to 250 calculate measurement information to localize the walking robot 10 by performing preprocessing of detected information (rotating angle information, image information and inertial information) transmitted from the encoders 110, the cameras 120 and the IMU 130, and provide the calculated measurement information to the localization unit 300.

The localization unit 300 estimates the position and pose of the walking robot 10 using various information provided from the first to fifth preprocessing units 210 to 250. The configuration of the localization unit 300 will be described in detail later with reference to FIG. 4.

The storage unit 400 serves to store predetermined information to perform localization of the walking robot 10 and results of localization, and stores mechanism information such as length information of the links (mechanisms connecting the joints), localization results such as position information of landmarks and position/pose information of the walking robot 10 of the walking robot 10 calculated using a plurality of algorithms (a plurality of filters) during the walking process of the walking robot 10, and a local map of the space on which the walking robot moves (i.e., a working space) prepared particularly using a SLAM algorithm of the plural algorithms.

Although an embodiment of the present disclosure describes the storage unit 400 to store the predetermined information to perform localization of the walking robot 10 and the results of localization as being separately provided, embodiments of the present disclosure may not employ the storage unit 400 but may employ a memory provided within the controller 200 to store the predetermined information to perform localization of the walking robot 10. In other words, the storage unit 400 may be integrated with a controller or separately provided in the walking robot. 10.

The driving units 450 are actuators, such as motors to transmit power generated by electricity or hydraulic pressure to the respective rotary joints 25 of the respective joint units 18, 19, 20, 21, 22, 23 and 24, and rotate the respective rotary joints 25 of the respective joint units 18, 19, 20, 21, 22, 23 and 24 according to control signals transmitted from the controller 200.

Figure 4:
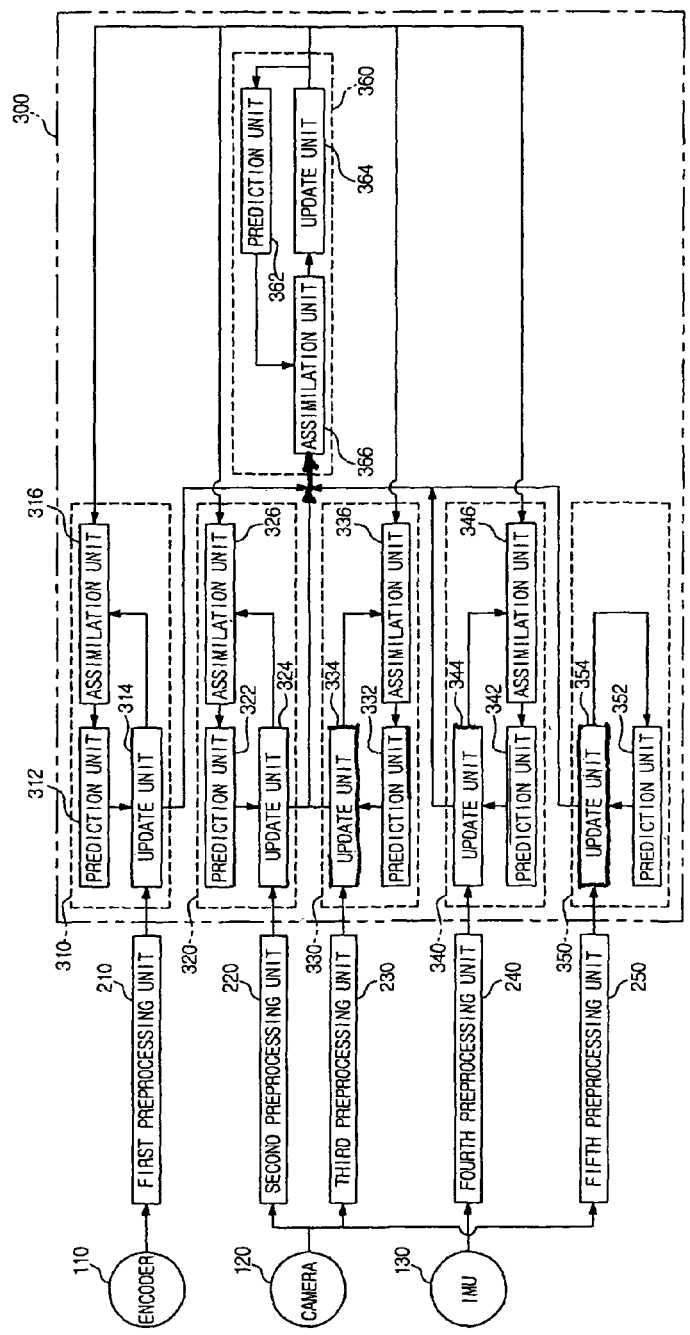
FIG. 4 is a view illustrating the configuration of a localization unit shown in FIG. 3.

Hereinafter, the configuration of the localization unit 300 shown in FIG. 3 will be described in detail with reference to FIG. 4. FIG. 4 is a view illustrating the configuration of the localization unit shown in FIG. 3.

As shown in FIG. 4, the localization unit 300 has a structure of a distributed filter system including a plurality of filters, i.e., first to fifth local filters 310 to 350. In FIG. 4, the first to fourth local filters 310, 320, 330 and 340 may be referred to as 'at least one first distribution filter' generating current relative position information, the fifth local filter 350 may be referred to as 'at least one second distribution filter' generating current absolute position information, and a fusion filter 360 serves to fuse the relative position information of the at least one first distribution filter (i.e., the first to fourth local filters 310, 320, 330 and 340) and the absolute position information of the at least one second distribution filter (i.e., the fifth local filter 350) and thus performs continuous and effective localization.

In an embodiment of the present disclosure, the localization unit 300 includes the first to fifth local filters 310, 320, 330, 340 and 350 and one fusion filter 360. Since the first to fifth local filters 310, 320, 330, 340 and 350 and the fusion filter 360 are independently operated, when localization of the walking robot 10 is performed, localization results may be respectively acquired from the first to fifth local filters 310, 320, 330, 340 and 350 and the fusion filter 360. From among the first to fifth local filters 310-350 and the fusion filter 360, the first to fourth local filters 310, 320, 330 and 340 and the fusion filter 360 respectively include prediction units 312, 322, 332, 342 and 362, update units 314, 324, 334, 344 and 364 and assimilation units 316, 326, 336, 346 and 366, and repeatedly perform prediction, update and assimilation until movement of the walking robot 10 is stopped. The fifth local filter 350 includes a prediction unit 352 and an update unit 354, and does not have an assimilation unit.

The respective prediction units 312, 322, 332, 342, 352 and 362 of the first to fifth local filters 310, 320, 330, 340 and 350 and the fusion filter 360 predict new position/pose information of the walking robot 10 from position/pose information of the walking robot 10 estimated or recognized in the earlier update step.

The respective update units 314, 324, 334, 344 and 354 of the first to fifth local filters 310, 320, 330, 340 and 350 update the position/pose information of the walking robot 10 predicted in the prediction step using detected information of the sensor module 100. Further, the update unit 364 of the fusion filter 360 fuses localization results such as the updated position/pose information of the walking robot 10 transmitted from the respective update units 314, 324, 334, 344 and 354 of the first to fifth local filters 310, 320, 330, 340 and 350, and update the position/pose information of the walking robot 10 predicted in the prediction step using the fused information.

The respective assimilation units 316, 326, 336 and 346 of the first to fourth local filters 310, 320, 330 and 340 reflect a localization result (the updated position/pose information) of the walking robot 10 transmitted from the update unit 364 of the fusion filter 360 in the position/pose information of the walking robot 10 updated in the update step. The fifth local filter 350 does not have an assimilation unit, and thus does not perform the assimilation process. The fifth local filter 350 handling topological node information periodically performs the prediction process, but performs the update process only if a node is detected. Since the fifth local filter 350 using absolute position information has better accuracy in localization and information quality than the first to fourth local filters 310, 320, 330 and 340 using relative position information, the assimilation process of the fifth local filter 350 with other position/pose information may lower consistency of the absolute position/pose information of the fifth local filter 350. The assimilation unit 366 of the fusion filter 360 fuses the updated relative position/pose information of the walking robot 10 transmitted from the respective update units 314, 324, 334 and 344 of the first to fourth local filters 310, 320, 330 and 340 and the updated absolute position/pose information of the walking robot 10 transmitted from the update unit 354 of the fifth local filter 350 with the position/pose information of the walking robot 10 predicted in the prediction step.

That is, the first to fifth local filters 310, 320, 330, 340 and 350 transmit the position/pose information of the walking robot 10, updated using the detected information of the respective sensors 110, 120 and 130, to the fusion filter 360, and the fusion filter 360 fuses and updates the received position/pose information of the walking robot 10 and feeds the updated position/pose information back to the first to fourth local filters 310, 320, 330 and 340. The updated position/pose information of the fusion filter 360 is not fed back to the fifth local filter 350.

Hereinafter, the common operation process of the first to fourth local filters 310, 320, 330 and 340 except for the fifth local filter 350 will be described. An embodiment of the present disclosure exemplarily describes that Kalman filters as being used as the first to fourth local filters 310, 320, 330 and 340.

The first to fourth local filters 310, 320, 330 and 340 are structurally independent of the fusion filter 360, and the sensors 110, 120 and 130 used by the first to fourth local filters 310, 320, 330 and 340 and processing methods of information detected through the sensors 110, 120 and 130 by the first to fourth local filters 310, 320, 330 and 340 may be different. The first to fourth local filters 310, 320, 330 and 340 have 3D positions, 3D poses (quaternion) q and 3D linear velocities v with respect to the world coordinate system, and 3D angular velocities w with respect to the body coordinate system as state variables $x_L(k|k)$ to estimate position/pose information of the walking robot 10.

In common, in the prediction step of the first to fourth local filters 310, 320, 330 and 340, modeling of current state variables is performed prior to fusion with sensor information (more particularly, measurement information) in the update state, as described in Equation 1, using a constant velocity model based on estimated state variables.

[Equation 1]

$$x_L(k|k-1) = \begin{bmatrix} r(k|k-1) \\ q(k|k-1) \\ v(k|k-1) \\ w(k|k-1) \end{bmatrix}$$

$$= \begin{bmatrix} r(k-1|k-1) + [v(k-1|k-1) + n_v(k)]\Delta t \\ q(k-1|k-1) \times q([w(k-1|k-1) + n_w(k)]\Delta t) \\ v(k-1|k-1) + n_v(k) \\ w(k-1|k-1) + n_w(k) \end{bmatrix}$$

Here, $n_v$ is a noise component of velocity, and $n_w$ is a noise component of angular velocity.

In the update step of the first to fourth local filters 310, 320, 330 and 340, Kalman filter update is performed using measurement information $z(k)$ acquired through preprocessing of detected information of the respective sensors 110, 120 and 130 and predicted observation values $h(k)$ calculated using state variables $x_L(k|k-1)$ calculated in the prediction step. After the predicted position/pose information of the walking robot 10 is updated, information is transmitted to the fusion filter 360 in the manner of input to an information filter, as described in Equation 2 and Equation 3.

$$i(k) = H^T(k)R^{-1}(k)z(k) \quad \text{[Equation 2]}$$

$$I(k) = H^T(k)R^{-1}(k)H(k) \quad \text{[Equation 3]}$$

Here, H(k) means a Jacobian matrix of the predicted measurement information h(k), and R(k) means a covariance matrix expressing uncertainty of the measurement information z(k).

Whenever the detected information from the sensor module 100 is input, such two processes (prediction and update) are repeatedly performed, and if a localization result such as updated relative position/pose information of the walking robot from the fusion filter 360 is input, the localization result such as the updated position/pose information of the walking robot of the fusion filter 360 is reflected in the relative position/pose information of the walking robot 10, updated in the update step of the first to fourth local filters 310, 320, 330 and 340, in the assimilation step using Kalman filter update similar to in the update step. Thus, the reflection of the detected information of different sensors in the first to fourth local filters 310, 320, 330 and 340 drives independently and the respective sensors possess the detected information of other sensors. Thereby, the respective sensors may supplement their own detected information through the detected information of other sensors, and thus accuracy in localization of the overall filter system 300 may be greatly improved.

Figure 5:
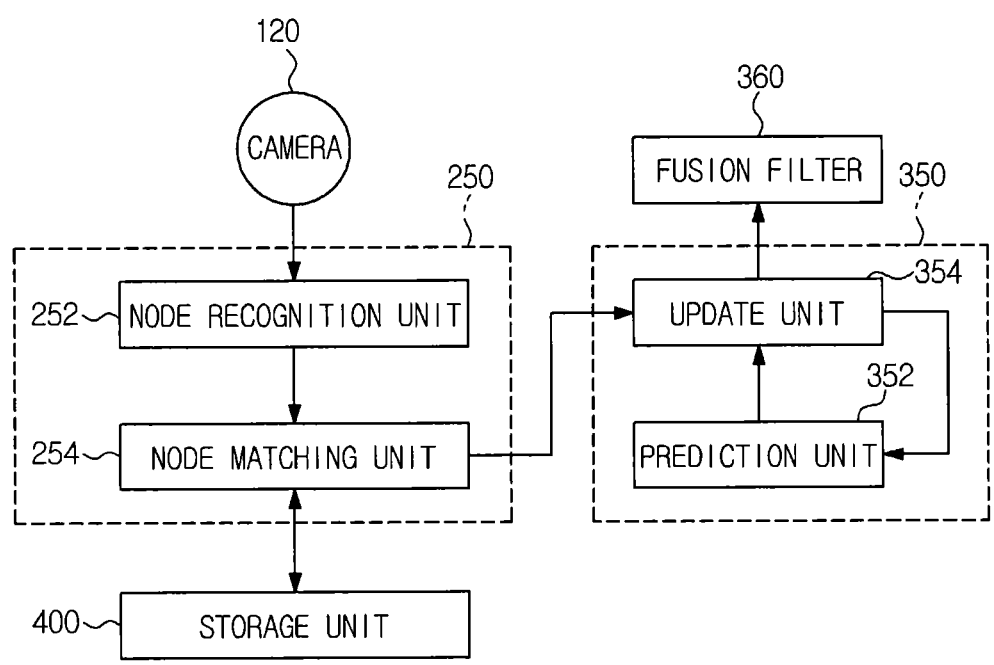
FIG. 5 is a view illustrating the configuration of a fifth preprocessing unit shown in FIG. 4.

FIG. 5 is a view illustrating the configuration of the fifth preprocessing unit 250 shown in FIG. 4. The fifth preprocessing unit 250 performs preprocessing of detected information such as rotating angle information, image information and inertial information transmitted from the cameras 120 and the IMU 130, and detects nodes A~E (with reference to FIG. 6) set in the space on which the walking robot 10 moves. In order to detect the nodes A~E, the fifth preprocessing unit 250 includes a node recognition unit 252 and a node matching unit 254. The node recognition unit 252 recognizes the nodes set in advance in the space on which the walking robot 10 moves by analyzing the detected information such as image information transmitted from the cameras 120. The node matching unit 254 serves to remove uncertainty which may be included in a node recognition result to increase a node recognition rate.

Figure 6:
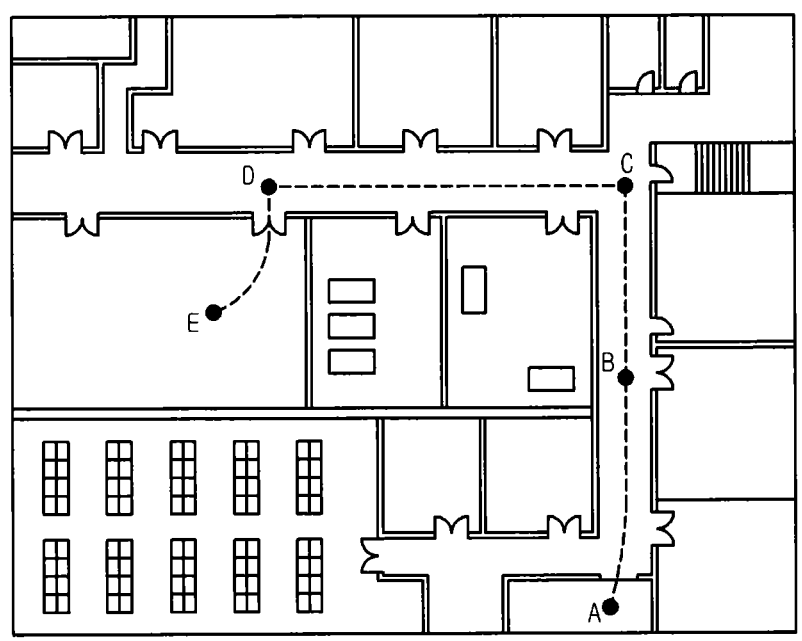
FIG. 6 is a view illustrating a node setting state in accordance with an embodiment of the present disclosure.

Hereinafter, the node recognition method in accordance with an embodiment of the present disclosure will be described in more detail with reference to FIG. 6. FIG. 6 is a view illustrating a node setting state in accordance with an embodiment of the present disclosure. Node recognition may be comparison of feature point information extracted from a current image with feature point information on the local map stored in the storage unit 400. The local map may be uploaded via a wired, wireless, or wired-wireless hybrid network. Here, a node adjacent to the current position of the walking robot 10 is detected by determining a node in which the number of corresponding feature points is large.

In an embodiment of the present disclosure, in order to provide absolute localization information to the fusion filter 360, designated points on the space on which the walking robot 10 moves are set as the nodes A~E. The node A~E may designate points having structural features, such as an intersection or a corner of a passage, points having visual features including various visual information, or points requiring accurate position information during movement of the walking robot 10. The position of the node coordinate system with respect to the world origin coordinate system may be set from a given design or a plan view of a building, and thereby a topological map having nodes including absolute position information may be constructed. In the determined respective nodes A~E, the 3D position of a feature point extracted from image information and 3D position/pose information of the walking robot 10 are simultaneously estimated using a vision sensor-based SLAM algorithm to achieve node recognition and matching. One point on the space on which the walking robot 10 moves set as a node origin O1, and feature points for localization are extracted from image information acquired through the cameras 120 while moving the cameras 120. The extracted feature point information is registered as a state variable of the fifth local filter 350, and positions of feature points and position/pose information of the cameras 120 are continuously estimated through a probabilistic filtering method. A local map including feature points around the nodes A~E acquired as a product of the vision sensor-based SLAM algorithm is stored in the storage unit 400. If cameras which may acquire 3D point cloud data (for example, stereo cameras or TOF cameras) are used, a 3D map including feature points and point cloud data may be additionally used as node information.

A node detection method includes processes such as node recognition and node matching. In node recognition which is the process of the node detection method, feature point information extracted from an image acquired through the cameras 120 are compared with feature point information stored in the storage unit 400. Through such comparison, a node having a large number of corresponding feature points may be recognized.

In node matching which is the process of the node detection method, the pose (position and direction) of the walking robot 10 in the recognized node coordinate system is determined. The feature point in the local map including the nodes has uncertainty information (covariance) corresponding to the 3D position in the node coordinate system. In the node matching process, when relations between the matched feature points are used, the uncertainty information corresponding to the 3D pose of the walking robot 10 in the node coordinate system may be calculated. For this purpose, Equation 4 below is used.

$$O_1 x_v = [\, O_{1_{r_v}} \quad O_{1_{q_v}} \,]^T, O_1 P_v \quad \text{[Equation 4]}$$

Equation 4 represents a 3D pose $O_1 x_v$ and uncertainty information $O_1 P_v$ of the walking robot 10 with respect to the node local coordinate system, acquired as a result of node detection. Here, O1$r_v$ is a 3D position (x, y, z) of the walking robot 10, and $O_1 q_v$ is 3D pose (angle) information (quaternion) of the walking robot 10.

The position of the walking robot 10 with respect to the node coordinate system, acquired through such a process, may be converted into a position with respect to the world origin coordinate system from topological map information using Equation 5 below, and may be transmitted to the fusion filter 360 as measurement information of topological nodes.

$$G_{x_v} = \begin{bmatrix} G_{r_v} \\ G_{q_v} \end{bmatrix} = \begin{pmatrix} G_{r_{O_1}} + R(G_{q_{O_1}})O_{1_{r_v}} \\ G_{q_{O_1}} \times O_1 q_v \end{pmatrix} \quad \text{[Equation 5]}$$

$$G_{P_v} = F^{O_1} P_v F^T \text{ where } F = \frac{\partial G_{x_v}}{\partial O_1 x_v}$$

Equation 5 converts the value of Equation 4 into a 3D pose $Gx_v$ with respect to the origin coordinate system of the overall space on which the walking robot 10 moves. Here, $Gr_v$ represents a 3D position of the walking robot with respect to the origin coordinate system, $Gq_v$ represents 3D angle information, R( ) represents a function of converting 3D pose (angle) information (quaternion) into a rotational matrix, x operator means angle conversion calculation (quaternion product), and F represent Jacobian conversion.

Topological node information handled by the fifth local filter 350 is distributed on the space, and thus the number of frequencies of node recognition for update is small and sampling every designated period is not possible. Therefore, differently from the first to fourth local filters 310, 320, 330 and 340, the fifth local filter 350 has only a 3D position r and a 3D pose (quaternion) q with respect to the world origin coordinate system as a state variable xL(k|k) to perform estimation.

Since velocity is not acquired from the estimated state variable, modeling of the current state variable is carried out, as stated in Equation 6, prior to fusion with node information during the update process using a constant position model based on the estimated state variable. Such a process is periodically performed every designated time regardless of update of node information in the prediction step of the fifth local filter 350.

$$X_L(k|k-1) = \begin{bmatrix} r(k|k-1) \\ q(k|k-1) \end{bmatrix} \quad \text{[Equation 6]}$$
$$= \begin{bmatrix} r(k-1|k-1) + n_r(k) \\ q(k-1|k-1) \times q(n_\theta(k)) \end{bmatrix}$$

Equation 6 represents a process of estimating position/pose using the constant position model, and XL(k|k−1) represents a state variable of the fifth local filter 350 processing topological information, and includes a 3D position r and a 3D pose (quaternion) q. That is, only noise components are reflected while maintaining the state variable in the earlier step (k−1). In Equation 6, $n_r$ is a noise component of velocity, and $n_e$ is a noise component of angular velocity.

In the update process of the fifth local filter 350, Kalman filter update is performed using measurement information z(k) acquired through node detection (with reference to Equation 7 below) and predicted observation information acquired using the state variable $X_L$(k|k−1) calculated in the prediction process (with reference to Equation 8 below).

$$z(k) = G_{X_v}, R(k) = GP_v \quad \text{[Equation 7]}$$

In Equation 7, in order to perform update, information acquired through Equation 5 is substituted into z(k) and R(k).

$$h_i^{node}(k) = h_5(r(k|k-1), q(k|k-1), r_{ref}(k-1|k-1), q_{ref}(k-1|k-1)) \quad \text{[Equation 8]}$$

Equation 8 represents calculation of a predicted observation valve h(k) using predicted state variable information (r(k|k−1), q(k|k−1)) and state variable values ($r_{\_ref}$(k−1|k−1), $q_{\_ref}$(k−1|k−1)) estimated in the earlier step and serving as references.

A filter module handling topological node information performs update using absolute position and direction values with respect to the world origin coordinate system. However, since direct application of Kalman filter update is difficult due to nonlinearity of the 3D position (quaternion) q, state variable values estimated in the earlier step are set as references, changes of such values are calculated, as described in Equation 9 and Equation 10 below, and are converted into a Rodrigues' rotation formula type, and then the update process is performed.

$$\Delta r = R^{-1}(q_{ref}) \times (r - r_{ref}) \quad \text{[Equation 9]}$$

$$\Delta q = \bar{q}_{ref} \times q \quad \text{[Equation 10]}$$

Equation 9 and Equation 10 are used to calculate components Δr and Δq of h(k), and $R^{-1}(q_{ref})$ is an inverse function of a function converting 3D position/pose information (quaternion) into a rotational matrix.

When update has been completed, in the same manner as the first to fourth local filters 310, 320, 330 and 340, information is transmitted to the fusion filter 360 in the manner of input to the information filter, as described in Equation 2 and Equation 3 above.

Hereinafter, a process of recognizing the position of the walking robot 10 using the first to fifth local filters 310, 320, 330, 340 and 350 will be described with reference to FIGS. 7 to 11.

<Operation of First Local Filter>

Figure 7:
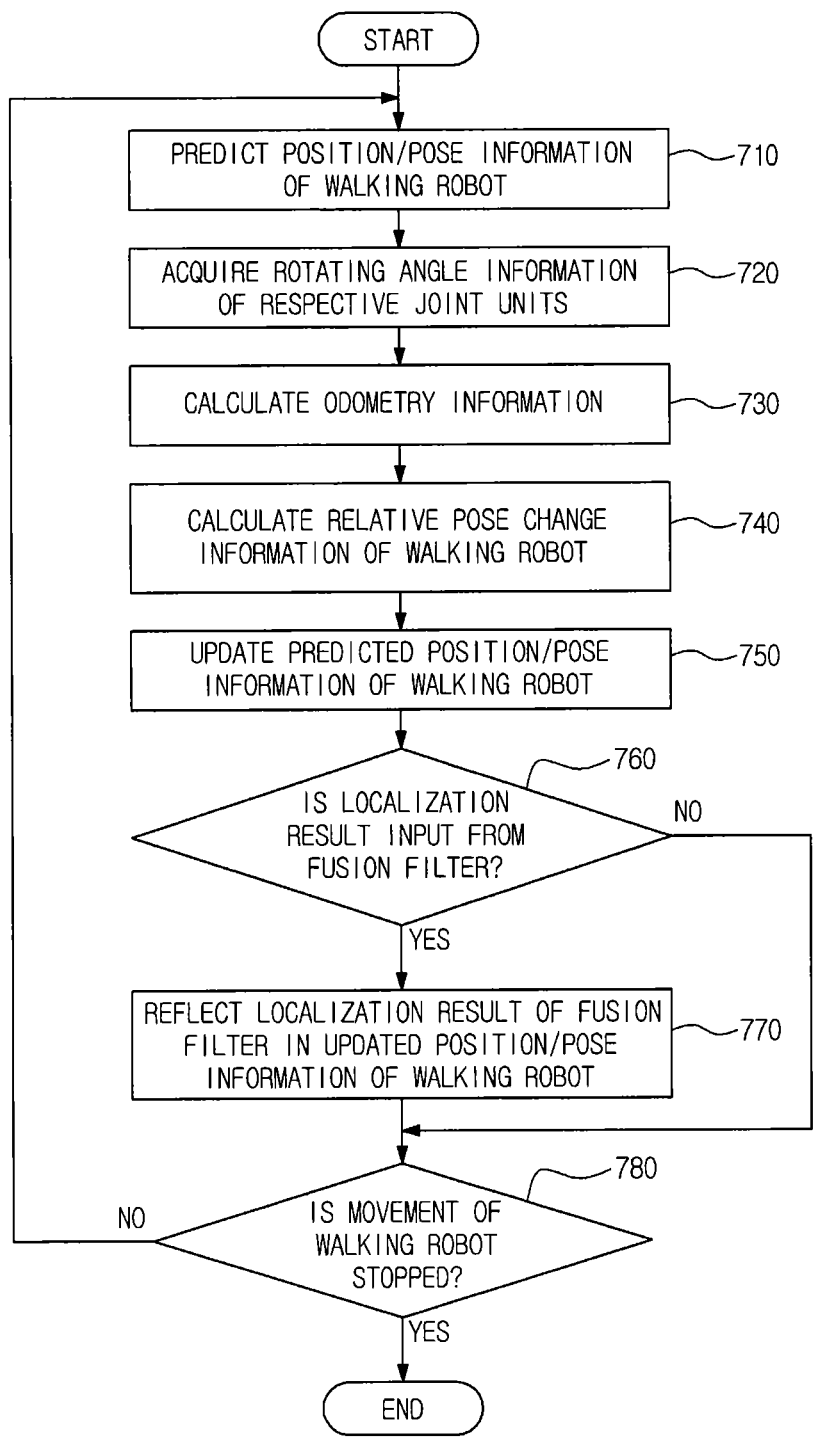
FIG. 7 is a flowchart illustrating a localization method of the walking robot using a first local filter shown in FIG. 4.

FIG. 7 is a flowchart illustrating a localization method of the walking robot using the first local filter 310 shown in FIG. 4.

The first local filter 310 uses the encoders 110 as sensors to perform localization of the walking robot 10, and updates predicted position/pose information of the walking robot 10 using odometry information of the walking robot 10. For convenience of description, the first local filter 310 will be defined as an odometry filter.

As initial conditions to describe the operation of the first local filter 310 in accordance with an embodiment of the present disclosure, predetermined information to perform localization of the walking robot 10 supposes that mechanism information (length information) of the links (mechanisms connecting the joints) are stored in advance in the storage unit 400. Hereinafter, with reference to time order, the earlier step will be represented as k−1, and the next step of the earlier step (may be represented as the current step) will be represented as k.

As shown in FIG. 7, the prediction unit 312 of the first local filter 310 predicts position/pose information of the walking robot 10 in the next step k from new position/pose information of the walking robot 10 obtained by reflecting a localization result of the fusion filter 360 in position/pose information of the walking robot 10 estimated (recognized) in the earlier update step k−1 (Operation 710). Such a process corresponds to the prediction step of the localization algorithm.

Next, the first preprocessing unit 210 acquires rotating angle information of the rotary joints of the joint units regarding walking of the walking robot 10 from the encoders 110 (Operation 720).

Thereafter, the first preprocessing unit 210 calculates odometry information using the mechanism information of the respective links stored in advance in the storage unit 400 and the rotating angle information of the respective rotary joints input through the encoders 110 (Operation 730). The odometry information may be position (coordinate) information and pose (angle) information of the walking robot 10 with respect to the origin coordinate system (the coordinate system using a point where the walking robot starts walking as the origin) on the space on which the walking robot 10 moves, and is calculated through accumulation using dead reckoning.

Thereafter, the first preprocessing unit 210 calculates relative pose change information of the walking robot 10 using odometry information in the step k and the step k−1 (Operation 740). The calculated relative pose change information of the walking robot 10 becomes the above-described measurement information z(k).

Observation information h(k) predicted by the first local filter 310, i.e., the odometry filter, may be represented as Equation 11 below.

$$h^{odo}(k)=h_3(r(k|k-1),q(k|k-1),r(k-1|k-1),q(k-1|k-1)) \quad \text{[Equation 11]}$$

Therefore, the update unit 314 substitutes the calculated relative pose change information of the walking robot 10 into z(k) of Equation 2, calculates a Jacobian matrix of Equation 11, and substitutes the calculated Jacobian matrix into H(k) of Equation 2 and Equation 3, thereby updating the position/pose information of the walking robot 10 predicted in the prediction step (Operation 750). Such a process corresponds to the update step of the localization algorithm. The update unit 314 transmits the updated position/pose information of the walking robot 10 to the assimilation unit 316.

Thereafter, the assimilation unit 316 detects whether or not a localization result (updated position/pose information) of the walking robot 10 is input from the update unit 364 of the fusion filter 360 (Operation 760). Upon detecting that the localization result of the walking robot 10 is input from the update unit 364 of the fusion filter 360 ('Yes' in Operation 760), the assimilation unit 316 reflects the localization result of the fusion filter 360 in the position/pose information of the walking robot 10 updated in the update step, and transmits the position/pose information of the walking robot 10 in which the localization result of the fusion filter 360 is reflected to the prediction unit 312 (Operation 770). Such a process corresponds to the assimilation step of the localization algorithm.

On the other hand, upon detecting that the localization result of the walking robot 10 is not input from the update unit 364 of the fusion filter 360 ('No' in Operation 760), the assimilation step is not performed and Operation 780 is performed.

Thereafter, the controller 200 detects whether or not movement of the walking robot 10 is stopped (Operation 780). The controller 200 detects that movement of the walking robot 10 is stopped when instructions to stop walking of the walking robot 10 are input through an input unit (not shown) by a user or rotating angle information is no longer input from the encoders 110.

Upon detecting that movement of the walking robot 10 is not stopped ('No' in Operation 780), the controller 200 returns to Operation 710 so as to continuously perform localization operation of the walking robot 10. Upon detecting that movement of the walking robot 10 is stopped ('Yes' in Operation 780), the controller 200 terminates the localization process of the walking robot 10.

<Operation of Second Local Filter>

Figure 8:
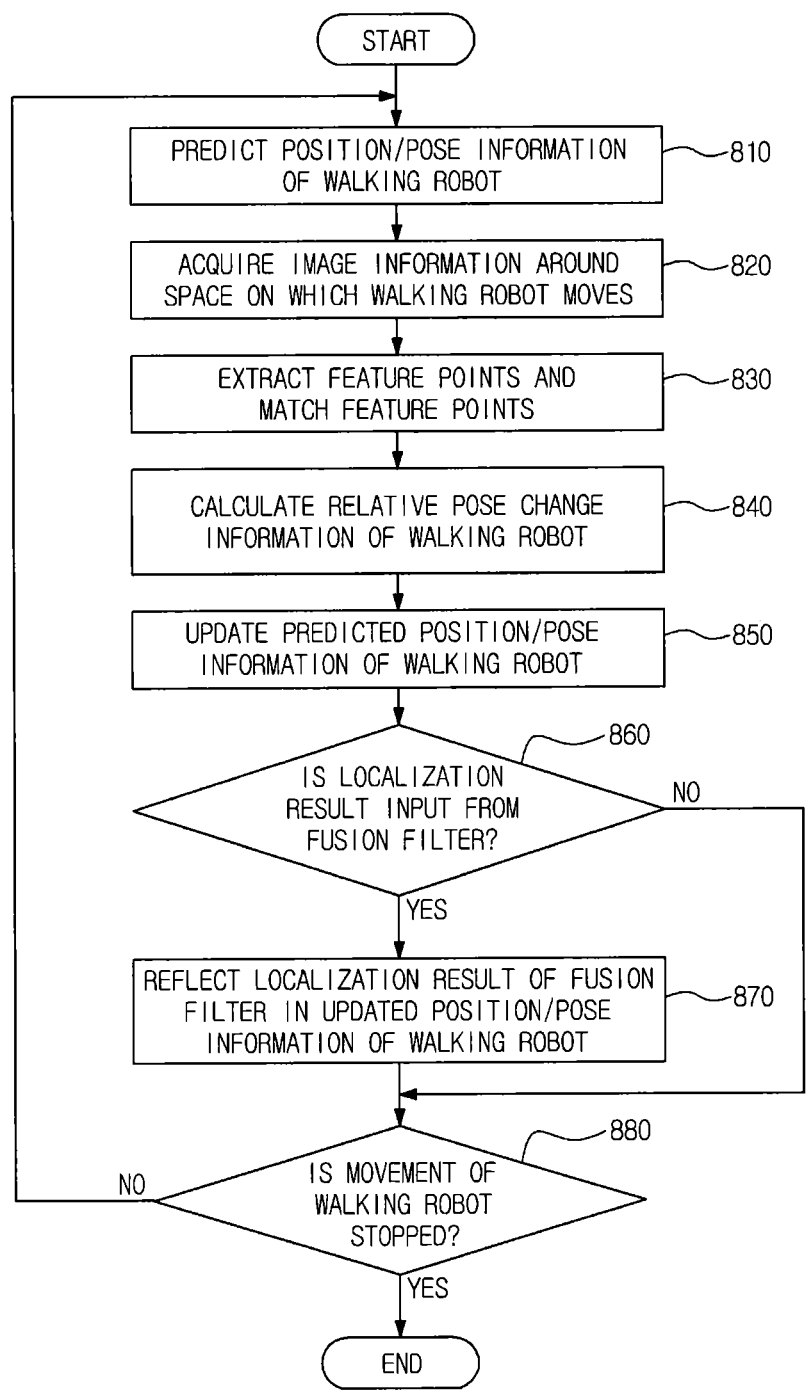
FIG. 8 is a flowchart illustrating a localization method of the walking robot using a second local filter shown in FIG. 4.

FIG. 8 is a flowchart illustrating a localization method of the walking robot using the second local filter 320 shown in FIG. 4.

The second local filter 320 uses the cameras 120 as sensors to perform localization of the walking robot 10, and updates predicted position/pose information of the walking robot 10 using relative pose change information of the walking robot 10. For convenience of description, the second local filter 320 will be defined as a vision sensor-based odometry filter.

As shown in FIG. 8, the prediction unit 322 of the second local filter 320 predicts position/pose information of the walking robot 10 in the next step k from new position/pose information of the walking robot 10 obtained by reflecting a localization result of the fusion filter 360 in position/pose information of the walking robot 10 estimated (recognized) in the earlier update step k−1 (Operation 810). Such a process corresponds to the prediction step of the localization algorithm.

Next, the second preprocessing unit 220 acquires image information around the space on which the walking robot 10 moves from the cameras 120 (Operation 820).

Thereafter, the second preprocessing unit 220 extracts visually feature points respectively from the image information acquired in the earlier step k−1 and the image information acquired in the current step k, and matches the extracted feature points (Operation 830).

Thereafter, the second preprocessing unit 220 calculates relative pose change information of the walking robot 10 from relations acquired through extraction and matching of the feature points in the same manner as the odometry filter 310 (Operation 840). The calculated relative pose change information becomes the above-described measurement information z(k).

Observation information h(k) predicted by the second local filter 320, i.e., the vision sensor-based filter, may be represented as Equation 12 below.

$$h^{vo}(k)=h_1(r(k|k-1),q(k|k-1),r(k-1|k-1),q(k-1|k-1)) \quad \text{[Equation 12]}$$

Therefore, the update unit 324 substitutes the calculated relative pose change information of the walking robot 10 into z(k) of Equation 2, calculates a Jacobian matrix of Equation 12, and substitutes the calculated Jacobian matrix into H(k) of Equation 2 and Equation 3, thereby updating the position/pose information of the walking robot 10 predicted in the prediction step (Operation 850). Such a process corresponds to the update step of the localization algorithm. The update unit 324 transmits the updated position/pose information of the walking robot 10 to the assimilation unit 326.

Thereafter, the assimilation unit 326 detects whether or not a localization result (updated position/pose information) of the walking robot 10 is input from the update unit 364 of the fusion filter 360 (Operation 860). Upon detecting that the localization result of the walking robot 10 is input from the update unit 364 of the fusion filter 360 ('Yes' in Operation 860), the assimilation unit 326 reflects the localization result of the fusion filter 360 in the position/pose information of the walking robot 10 updated in the update step, and transmits the position/pose information of the walking robot 10 in which the localization result of the fusion filter 360 is reflected to the prediction unit 322 (Operation 870). Such a process corresponds to the assimilation step of the localization algorithm.

On the other hand, upon detecting that the localization result of the walking robot 10 is not input from the update unit 364 of the fusion filter 360 ('No' in Operation 860), the assimilation step is not performed and Operation 880 is performed.

Thereafter, the controller 200 detects whether or not movement of the walking robot 10 is stopped (Operation 880). The controller 200 detects that movement of the walking robot 10 is stopped when instructions to stop walking of the walking robot 10 are input through an input unit (not shown) by a user or rotating angle information is no longer input from the encoders 110.

Upon detecting that movement of the walking robot 10 is not stopped ('No' in Operation 880), the controller 200 returns to Operation 810 so as to continuously perform localization operation of the walking robot 10. Upon detecting that movement of the walking robot 10 is stopped ('Yes' in Operation 880), the controller 200 terminates the localization process of the walking robot 10.

<Operation of Third Local Filter>

Figure 9:
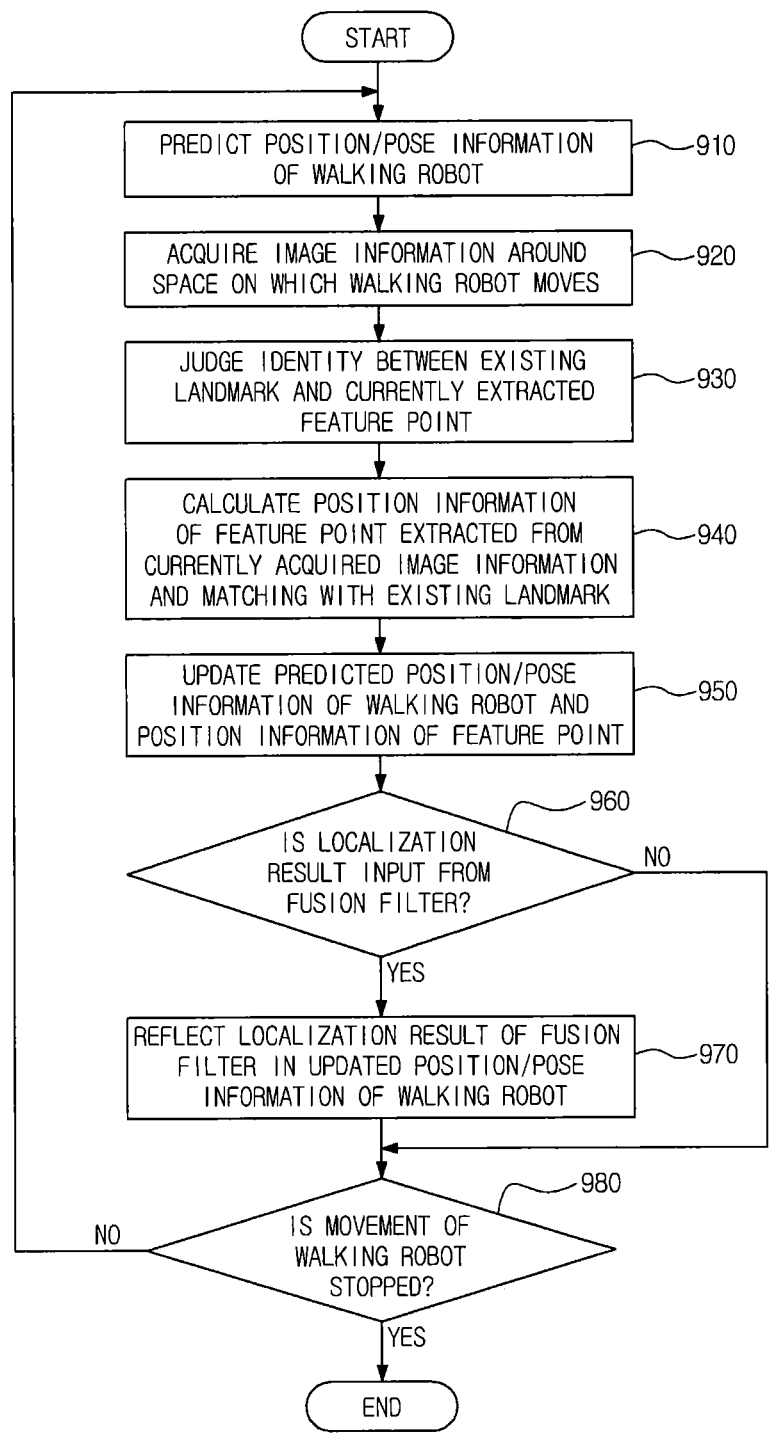
FIG. 9 is a flowchart illustrating a localization method of the walking robot using a third local filter shown in FIG. 4.

FIG. 9 is a flowchart illustrating a localization method of the walking robot using the third local filter 330 shown in FIG. 4.

The third local filter 330 uses the cameras 120 as sensors to perform localization of the walking robot 10, and simultaneously estimates 3D position information of a feature point extracted from image information and 3D position/pose information of the walking robot 10. Therefore, differently from other local filters 310, 320, 340 and 350, the third local filter 330 additionally has a state variable $y_i(k|k)$ to the position of the feature point.

For convenience of description, the third local filter 330 will be defined as a vision sensor-based simultaneous localization and mapping (SLAM) filter. The vision sensor-based SLAM filter is advantageous in that it may estimate position/pose information of the walking robot 10 in the world coordinate system, but is disadvantageous in that it maintains position information of a feature point as state variables and thus, as moving distance increases, calculation time increases.

As shown in FIG. 9, the prediction unit 332 of the third local filter 330 predicts position/pose information of the walking robot 10 in the next step k from new position/pose information of the walking robot 10 obtained by reflecting a localization result of the fusion filter 360 in position/pose information of the walking robot 10 estimated (recognized) in the earlier update step k−1, and predicts position information of a feature point in the next step k of the walking robot 10 from position information of the feature point estimated (recognized) in the earlier update step k−1 (Operation 910). Such a process corresponds to the prediction step of the localization algorithm.

Next, the third preprocessing unit 230 acquires image information around the space on which the walking robot 10 moves from the cameras 120 (Operation 920).

Thereafter, the third preprocessing unit 230 detects identity between an existing landmark stored in the storage unit 400 and the feature point extracted from the currently acquired image information (Operation 930). That is, the third preprocessing unit 230 detects whether or not the feature point extracted from the currently acquired image information has been used as the existing landmark or whether or not the feature point will be registered as a new feature point, through tracking and matching of the feature point.

Thereafter, the third preprocessing unit 230 calculates position information of the feature point registered as the existing landmark and position of information of the feature point extracted from the currently acquired image information and matching with the existing landmark (Operation 940). The calculated position information of the feature point matching with the existing landmark becomes the above-described measurement information z(k).

Observation information h(k) predicted by the third local filter 330, i.e., the vision sensor-based SLAM filter, may be represented as Equation 13 below.

$$h_i^{vs}(k) = h_2(r(k|k-1), q(k|k-1), y_i(k|k-1)) \qquad \text{[Equation 13]}$$

Therefore, the update unit 334 substitutes the calculated position information of the feature point matching with the existing landmark into z(k) of Equation 2, calculates a Jacobian matrix of Equation 13, and substitutes the calculated Jacobian matrix into H(k) of Equation 2 and Equation 3, thereby updating the position/pose information of the walking robot 10 and the position information of the feature point (Operation 950) predicted in the prediction step. Such a process corresponds to the update step of the localization algorithm. The update unit 334 transmits the updated position/pose information of the walking robot 10 to the assimilation unit 336.

Thereafter, the assimilation unit 336 detects whether or not a localization result (updated position/pose information) of the walking robot 10 is input from the update unit 364 of the fusion filter 360 (Operation 960). Upon detecting that the localization result of the walking robot 10 is input from the update unit 364 of the fusion filter 360 ('Yes' in Operation 960), the assimilation unit 336 reflects the localization result of the fusion filter 360 in the position/pose information of the walking robot 10 updated in the update step, and transmits the position/pose information of the walking robot 10 in which the localization result of the fusion filter 360 is reflected to the prediction unit 332 (Operation 970). Such a process corresponds to the assimilation step of the localization algorithm.

On the other hand, upon detecting that the localization result of the walking robot 10 is not input from the update unit 364 of the fusion filter 360 ('No' in Operation 960), the assimilation step is not performed and Operation 980 is performed.

Thereafter, the controller 200 detects whether or not movement of the walking robot 10 is stopped (Operation 980). The controller 200 detects that movement of the walking robot 10 is stopped when instructions to stop walking of the walking robot 10 are input through the input unit (not shown) by a user or rotating angle information is no longer input from the encoders 110.

Upon detecting that movement of the walking robot 10 is not stopped ('No' in Operation 980), the controller 200 returns to Operation 910 so as to continuously perform localization operation of the walking robot 10. Upon detecting that movement of the walking robot 10 is stopped ('Yes' in Operation 980), the controller 200 terminates the localization process of the walking robot 10.

<Operation of Fourth Local Filter>

Figure 10:
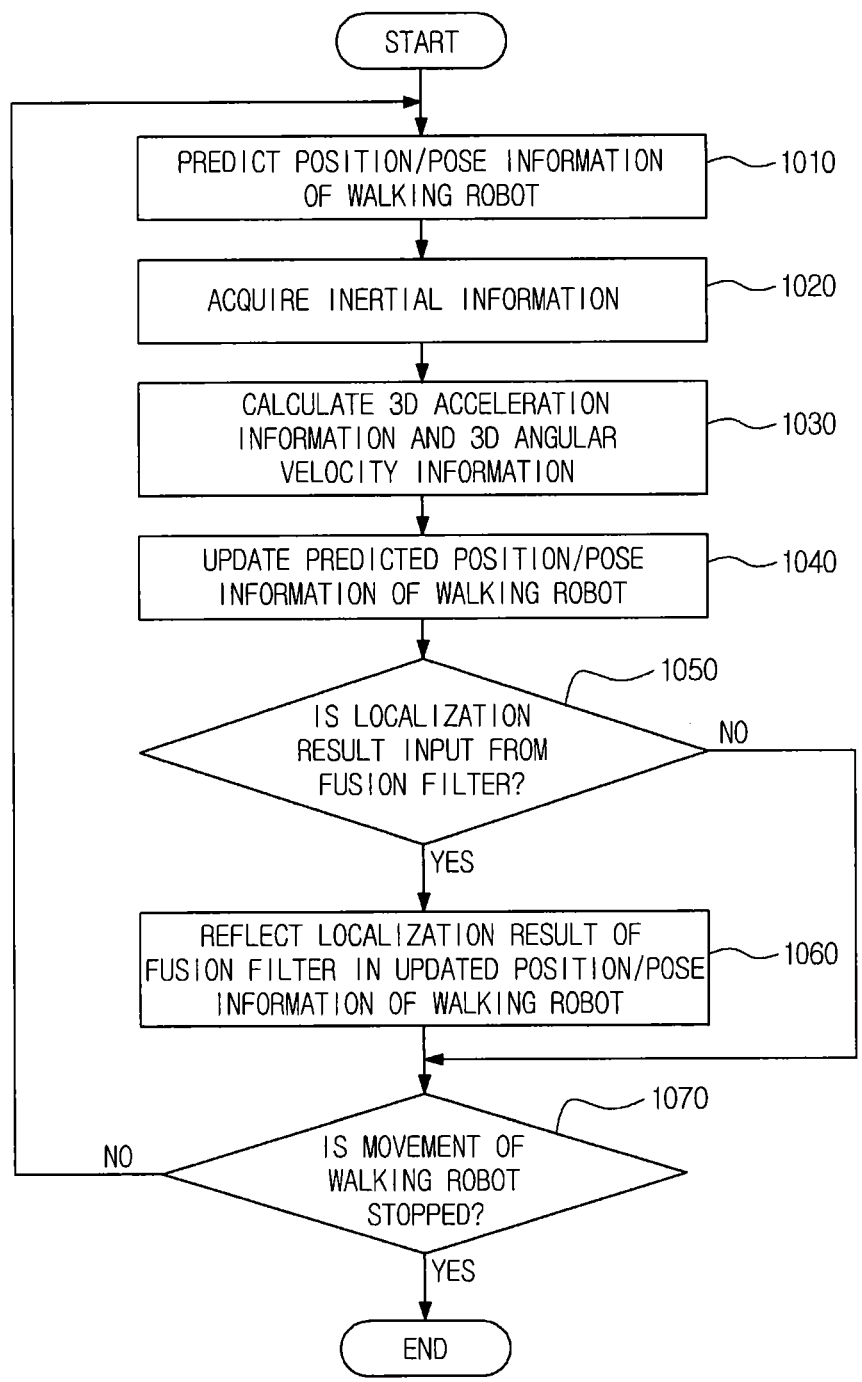
FIG. 10 is a flowchart illustrating a localization method of the walking robot using a fourth local filter shown in FIG. 4.

FIG. 10 is a flowchart illustrating a localization method of the walking robot using the fourth local filter 340 shown in FIG. 4.

The fourth local filter 340 uses the IMU 130 as a sensor to perform localization of the walking robot 10, and updates predicted position/pose information of the walking robot 10 using 3D acceleration information and 3D angular velocity information. For convenience of description, the fourth local filter 340 will be defined as an inertial measurement unit (IMU) filter.

As shown in FIG. 10, the prediction unit 342 of the fourth local filter 340 predicts position/pose information of the walking robot 10 in the next step k from new position/pose information of the walking robot 10 obtained by reflecting a localization result of the fusion filter 360 in position/pose information of the walking robot 10 estimated (recognized) in the earlier update step k−1 (Operation 1010). Such a process corresponds to the prediction step of the localization algorithm.

Next, the fourth preprocessing unit 240 acquires inertia information from the IMU (Operation 1020).

Thereafter, the fourth preprocessing unit 240 calculates 3D acceleration information and 3D angular velocity information from the acceleration information and angular velocity information detected through the IMU 130 (Operation 1030). The calculated 3D acceleration information and 3D angular velocity information become the above-described measurement information z(k).

Observation information h(k) predicted by the fourth local filter 340, i.e., the IMU filter, may be represented as Equation 4 below.

$$h^{imu}(k)=h_4(q(k|k-1),w(k|k-1))$$ [Equation 14]

Therefore, the update unit 344 substitutes the calculated 3D acceleration information and 3D angular velocity information into z(k) of Equation 2, calculates a Jacobian matrix of Equation 14, and substitutes the calculated Jacobian matrix into H(k) of Equation 2 and Equation 3, thereby updating the position/pose information of the walking robot 10 predicted in the prediction step (Operation 1040). Such a process corresponds to the update step of the localization algorithm. The update unit 344 transmits the updated position/pose information of the walking robot 10 to the assimilation unit 346.

Thereafter, the assimilation unit 346 detects whether or not a localization result (updated position/pose information) of the walking robot 10 is input from the update unit 364 of the fusion filter 360 (Operation 1050). Upon detecting that the localization result of the walking robot 10 is input from the update unit 364 of the fusion filter 360 ('Yes' in Operation 1050), the assimilation unit 346 reflects the localization result of the fusion filter 360 in the position/pose information of the walking robot 10 updated in the update step, and transmits the position/pose information of the walking robot 10 in which the localization result of the fusion filter 360 is reflected to the prediction unit 342 (Operation 1060). Such a process corresponds to the assimilation step of the localization algorithm.

On the other hand, upon detecting that the localization result of the walking robot 10 is not input from the update unit 364 of the fusion filter 360 ('No' in Operation 1050), the assimilation step is not performed and Operation 1070 is performed.

Thereafter, the controller 200 detects whether or not movement of the walking robot 10 is stopped (Operation 1070). The controller 200 detects that movement of the walking robot 10 is stopped when instructions to stop walking of the walking robot 10 are input through the input unit (not shown) by a user or rotating angle information is no longer input from the encoders 110.

Upon detecting that movement of the walking robot 10 is not stopped ('No' in Operation 1070), the controller 200 returns to Operation 1010 so as to continuously perform localization operation of the walking robot 10. Upon detecting that movement of the walking robot 10 is stopped ('Yes' in Operation 1070), the controller 200 terminates the localization process of the walking robot 10.

<Operation of Fifth Local Filter>

Figure 11:
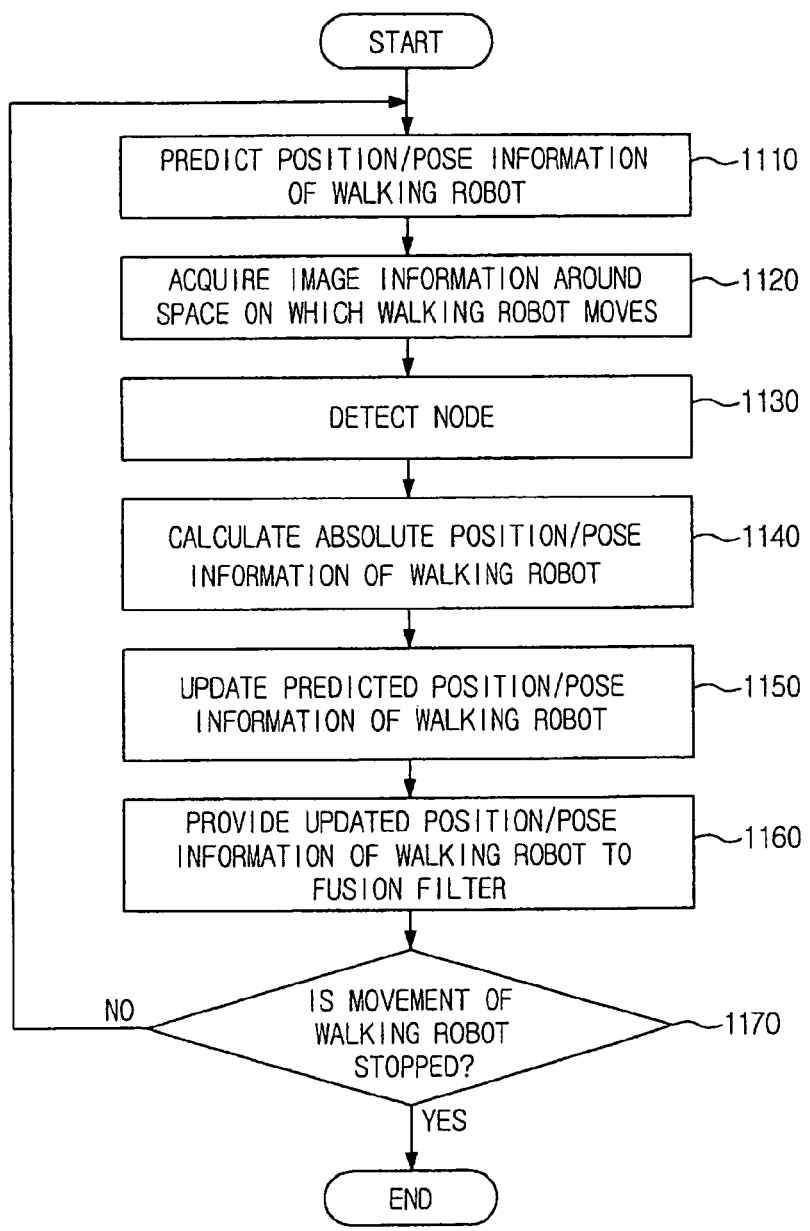
FIG. 11 is a flowchart illustrating a localization method of the walking robot using a fifth local filter shown in FIG. 4.

FIG. 11 is a flowchart illustrating a localization method of the walking robot using the fifth local filter 350 shown in FIG. 4.

The fifth local filter 350 uses the cameras 120 as sensors to perform localization of the walking robot 10, and simultaneously achieve node recognition through 3D position information of a feature point extracted from image information and estimation of 3D position/pose information of the walking robot 10. Therefore, differently from the first to fourth local filters 310, 320, 330 and 340, the fifth local filter 350 has only a 3D position r and a 3D pose (quaternion) q with respect to the world origin coordinate system as state variables xL(k|k) to perform estimation.

As shown in FIG. 11, the prediction unit 352 of the fifth local filter 350 predicts position/pose information of the walking robot 10 in the next step k from new position/pose information of the walking robot 10 obtained by reflecting new node recognition results in position/pose information of the walking robot 10 estimated (recognized) in the earlier update step k−1, and predicts position information of a node in the next step k of the walking robot 10 from position information of the node estimated (recognized) in the earlier update step k−1 (Operation 1110). Such a process corresponds to the prediction step of the localization algorithm.

Next, the fifth preprocessing unit 250 acquires image information around the space on which the walking robot 10 moves from the cameras 120 (Operation 1120).

Thereafter, the fifth preprocessing unit 250 detects a node through detection of identity between local map information stored in the storage unit 300 and a feature point extracted from the currently acquired image information (Operation 1130). That is, the fifth preprocessing unit 250 detects a node corresponding to the feature point extracted from the currently acquired image information through a tracking and matching process of feature points.

Thereafter, the fifth preprocessing unit 250 calculates absolute position/pose information z(k) of the walking robot 10 (with reference to Equation 7) on the local map based on the position of the detected node (Operation 1140).

Kalman filter update is performed using the absolute position/pose information z(k) calculated through node detection and predicted observation information h(k) (with reference to Equation 8) (Operation 1150). That is, the update unit 354 of the fifth local filter 350 substitutes calculated existing node position information into z(k) of Equation 7, calculates a Jacobian matrix of Equation 6, and substitutes the calculated Jacobian matrix into H(k) of Equation 2 and Equation 3, thereby updating the position/pose information of the walking robot 10 and the position information of the feature point predicted in the prediction step. Such a process corresponds to the update step of the localization algorithm.

Thereafter, the update unit 354 of the fifth local filter 350 provides the updated absolute position/pose information of the walking robot 10 to the assimilation unit 366 of the fusion filter 360 (Operation 1160). The assimilation unit 366 having received the absolute position/pose information from the fifth local filter 350 reflects the absolute position/pose information from the fifth local filter 350 in the position/pose information of the walking robot 10 updated in the update step, and then transmits the position/pose information of the walking robot 10 in which the absolute position/pose information from the fifth local filter 350 is reflected to the prediction unit 362 of the fusion filter 360. Thereby, the assimilation step of the localization algorithm in the fusion filter 360 is performed.

Thereafter, the controller 200 detects whether or not movement of the walking robot 10 is stopped (Operation 1170). The controller 200 detects that movement of the walking robot 10 is stopped when instructions to stop walking of the walking robot 10 are input through the input unit (not shown) by a user or rotating angle information is no longer input from the encoders 110.

Upon detecting that movement of the walking robot 10 is not stopped ('No' in Operation 1170), the controller 200 returns to Operation 1110 so as to continuously perform localization operation of the walking robot 10. Upon detecting that movement of the walking robot 10 is stopped ('Yes' in Operation 1170), the controller 200 terminates the localization process of the walking robot 10.

Hereinafter, an operation process of the fusion filter 360 will be described with reference to FIG. 4.

The operational principle of the fusion filter 360 is basically similar to that of the first to fourth local filters 310, 320, 330 and 340, but the fusion filter 360 uses an information filter as an operating filter so that the information filter may be operated in a dual type with the Kalman filter, used as the operating filter of each of the first to fourth local filters 310, 320, 330 and 340. The information filter has an information state vector yG(k|k) and an information matrix YG(k|k), as represented in Equation 15 and Equation 16 below, as state variables to estimate position and pose of the walking robot 10.

$$y_G(k|k) = P_G^{-1}(k|k)x_G(k|k)$$ [Equation 15]

$$Y_G(k|k) = P_G^{-1}(k|k)$$ [Equation 16]

The reason why the fusion filter 360 uses the information filter as an operating filter is that localization results such as updated position/pose information of the walking robot 10 transmitted from the first to fifth local filters 310, 320, 330, 340 and 350 may be simply fused in the manner of addition, as represented in Equation 17 and Equation 18 below, in the assimilation step of the fusion filter 360.

$$y_G(k|k) = y_G(k|k-1) + \sum_{i=1}^{N} i_i(k)$$ [Equation 17]

$$Y_G(k|k) = Y_G(k|k-1) + \sum_{i=1}^{N} I_i(k)$$ [Equation 18]

Position/pose recognition result of the fusion filter 360 updated using the position/pose information of the walking robot 10 assimilated in the assimilation step is transmitted again to the first to fourth local filters 310, 320, 330 and 340, thereby maintaining consistency in estimated localization values of the entirety of the distributed filter system 300.

In the structure of such a distributed filter system 300, if the first to fifth local filters 310, 320, 330, 340 and 350 are defective, information transmitted to the fusion filter 360 may be blocked, and after such a defect of the first to fifth local filters 310, 320, 330, 340 and 350 has been resolved, localization may be continuously performed, thereby improving robustness of the overall localization system.

<Operation of Fusion Filter>

Figure 12:
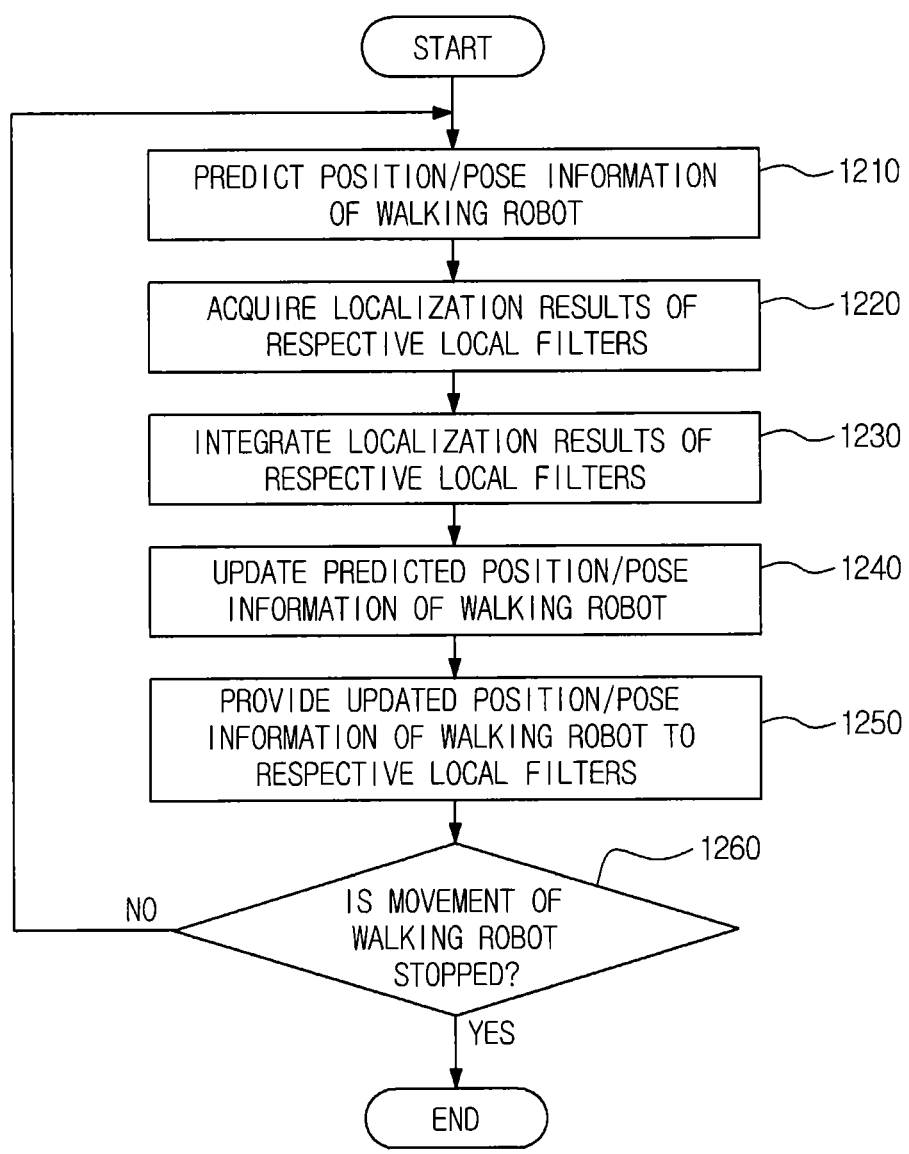
FIG. 12 is a flowchart illustrating a localization method of the walking robot using a fusion filter shown in FIG. 4.

FIG. 12 is a flowchart illustrating a localization method of the walking robot using the fusion filter 360 shown in FIG. 4.

As shown in FIG. 12, the prediction unit 362 of the fusion filter 360 predicts position/pose information of the walking robot 10 in the next step k from position/pose information of the walking robot 10 estimated (recognized) in the earlier update step k-1 (Operation 1210). Such a process corresponds to the prediction step of the localization algorithm.

Next, the assimilation unit 366 acquires localization results such as updated relative position/pose information and absolute position/pose information of the walking robot 10 from the first to fifth local filters 310, 320, 330, 340 and 350 (Operation 1220).

Thereafter, the assimilation unit 366 integrates the localization results of the first to fifth local filters 310, 320, 330, 340 and 350 (operation 1230). Here, the absolute position/pose information acquired through the fifth local filter 350 is reflected in the relative position/pose information acquired through the first to fourth local filters 310, 320, 330 and 340, and thus an error which may be contained in the relative position/pose information acquired through the first to fourth local filters 310, 320, 330 and 340 may be improved. Therethrough, the walking robot 10 in accordance with an embodiment of the present disclosure may continuously perform more effective localization.

Next, the update unit 364 updates the position/pose information of the walking robot 10 predicted in the prediction step using the integrated localization results (Operation 1240). Such a process corresponds to the update step of the localization algorithm. The update unit 364 transmits the updated position/pose information of the walking robot 10 to the assimilation units 316, 326, 336 and 346 of the first to fourth local filters 310, 320, 330 and 340 (Operation 1250). The fifth local filter 350 does not receive the information fed back from the fusion filter 360.

Thereafter, the controller 200 detects whether or not movement of the walking robot 10 is stopped (Operation 1260). The controller 200 detects that movement of the walking robot 10 is stopped when instructions to stop walking of the walking robot 10 are input through the input unit (not shown) by a user or rotating angle information is no longer input from the encoders 110.

Upon detecting that movement of the walking robot 10 is not stopped ('No' in Operation 1260), the controller 200 returns to Operation 1210 so as to continuously perform localization operation of the walking robot 10. Upon detecting that movement of the walking robot 10 is stopped ('Yes' in Operation 1260), the controller 200 terminates the localization process of the walking robot 10.

Although, from among various mobile apparatuses, the walking robot 10 has been exemplarily described to perform localization using the distributed filter system with reference to FIGS. 1 to 12, mobile robots having various shapes in addition to the walking robot 10 and mobile devices (a mobile phone, a tablet PC, etc.) which do not have an autonomous mobile function but are manipulated and carried by a user while moving may perform localization using the distributed filter system proposed in an embodiment of the present disclosure.

Further, although the encoders, the cameras and the IMU sensors (three kinds of sensors) are used as sensors to perform localization of a mobile apparatus, any sensor (or device) which may perform localization of a mobile apparatus, such as a distance sensor, a compass sensor, or a global positioning system (GPS), may be used.

Figure 13:
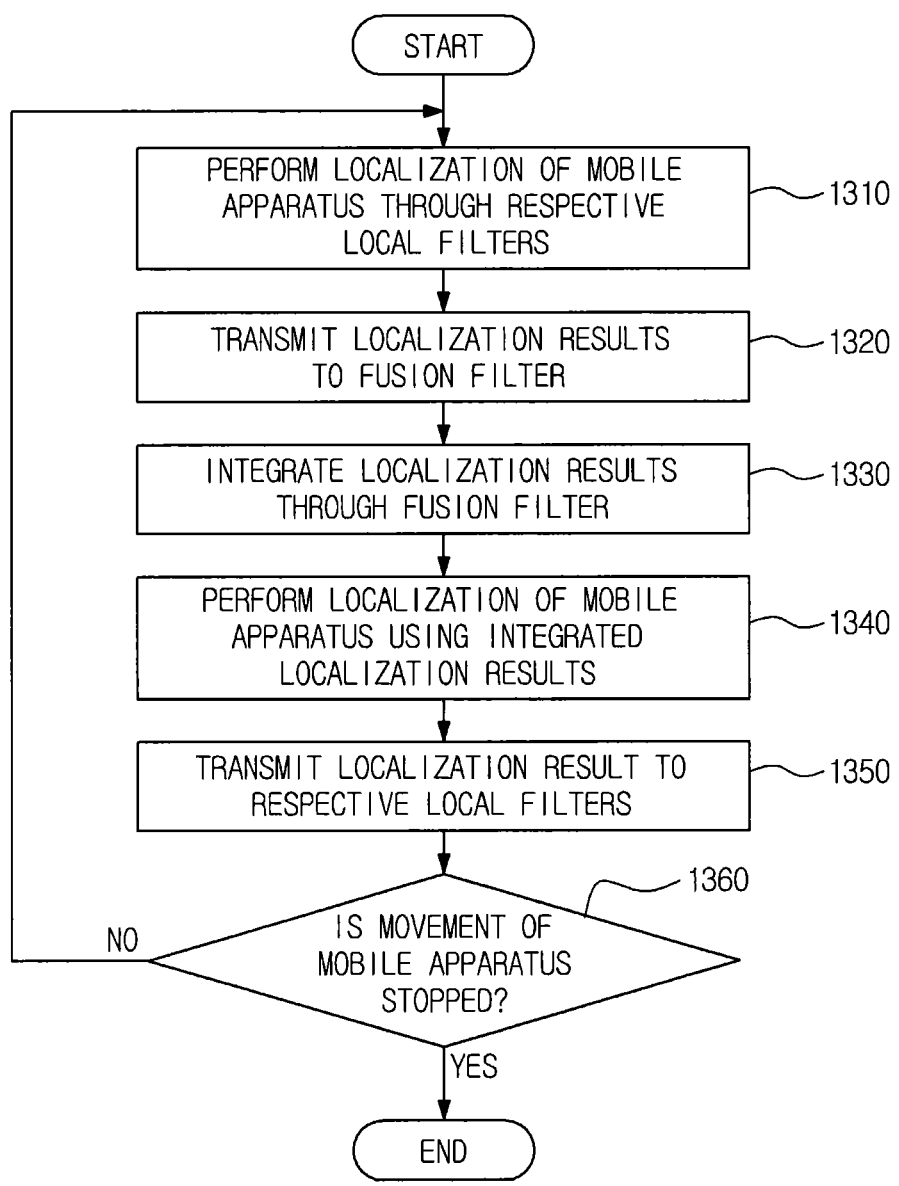
FIG. 13 is a flowchart illustrating a localization method of a mobile apparatus in accordance with an embodiment of the present disclosure.

FIG. 13 is a flowchart illustrating a localization method of a mobile apparatus in accordance with an embodiment of the present disclosure.

Hereinafter, the localization method of the mobile apparatus in accordance with an embodiment of the present disclosure will be described with reference to FIG. 13.

First, the respective local filters perform localization of the mobile apparatus (Operation 1310).

Thereafter, the respective local filters transmit localization results to the fusion filter (Operation 1320).

Next, the fusion filter integrates the localization results transmitted from the respective local filters (Operation 1330).

Thereafter, the fusion filter performs localization of the mobile apparatus using the integrated localization results (Operation 1340).

Next, the fusion filter transmits a localization result to the respective local filters (Operation 1350).

Thereafter, whether or not movement of the mobile apparatus is stopped is detected (Operation 1360). Upon detecting that movement of the mobile apparatus is not stopped ('No' in Operation 1360), the method returns to Operation 1310 and thus localization of the mobile apparatus is continuously performed.

Upon detecting that movement of the mobile apparatus is stopped ('Yes' in Operation 1360), the localization process of the mobile apparatus is terminated.

As is apparent from the above description, a mobile apparatus and a localization method thereof in accordance with an embodiment of the present disclosure perform localization of the mobile apparatus using a distributed filter system including a plurality of local filters independently operated and one fusion filter integrating results of localization performed through the respective local filters, and additionally apply accurate topological absolute position information to the distributed filter system to improve localization performance (accuracy, convergence and speed in localization, etc.) of the mobile apparatus on a wide space.

The above-described embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of computer-readable media include magnetic media such as hard disks, floppy disks, and magnetic tape; optical media such as CD-ROM disks, DVDs and Blu-rays; magneto-optical media such as optical disks; and hardware devices that are specially configured to store and perform program instructions, such are read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate ARRAY (FPGA), which executes program instructions. Examples of program instructions include both machine code, such as produced by a compiler, and files containing higher level code that may be executed by the computer using an interpreter. The above-described devices may be configured to act as one or more software modules in order to perform the operations of the above-described embodiments, or vice-versa.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A mobile apparatus, comprising:
    a plurality of sensors;
    a plurality of first distribution filters configured to generate current relative position information of the mobile apparatus using sensor information detected by the plurality of sensors;
    at least one second distribution filter configured to generate current absolute position information of the mobile apparatus using the sensor information detected by the plurality of sensors; and
    a fusion filter configured to fuse the relative position information of the plurality of first distribution filters and the absolute position information of the at least one second distribution filter to perform localization of the mobile apparatus;
    wherein the at least one second distribution filter is further configured to generate the absolute position information through detection of at least one node predetermined on a space on which the mobile apparatus moves,
    wherein the fusion filter is further configured to transmit updated position/pose information of the mobile apparatus to the plurality of first distribution filters, and
    wherein the first distribution filters are further configured to assimilate the updated position/pose information from the fusion filter for generating the current relative position information of the mobile apparatus.

2. The mobile apparatus according to claim 1, wherein the at least one second distribution filter comprises:
    a predictor configured to predict position/pose information of the mobile apparatus; and
    an updater configured to update the predicted position/pose information of the mobile apparatus using the sensor information detected by the plurality of sensors;
    wherein the at least one second distribution filter is further configured to provide the updated position/pose information to the fusion filter to reflect the updated position/pose information in update of position/pose information of the fusion filter.

3. The mobile apparatus according to claim 2, wherein the prediction of the position/pose information is periodically performed, and
    wherein the update of the position/pose information is performed once the at least one node is detected.

4. The mobile apparatus according to claim 2, wherein the plurality of first distribution filters are configured to reflect fused position/pose information of the fusion filter in update of the relative position information, and
    wherein the at least one second distribution filter is configured to reflect the fused position/pose information in update of the absolute position information.

5. The mobile apparatus according to claim 1, further comprising:
    a preprocessor configured to recognize the at least one node predetermined on the space on which the mobile apparatus moves, configured to generate node detection information from which uncertainty of node detection is removed through comparison between a node recognition result and a predetermined local map, and configured to provide the node detection information to the at least one second distribution filter.

6. The mobile apparatus according to claim 5, wherein the preprocessing unit comprises:
    a node recognizer configured to recognize the at least one node; and
    a node matcher configured to remove the uncertainty of node detection.

7. The mobile apparatus according to claim 5, further comprising:
    a storage configured to store the predetermined local map.

8. The mobile apparatus according to claim 1, wherein the plurality of sensors includes at least one camera configured to photograph the space on which the mobile apparatus moves.

9. A localization method of a mobile apparatus, the localization method comprising:
- generating, by a plurality of first distribution filters, current relative position information of the mobile apparatus using sensor information detected by a plurality of sensors;
- generating, by at least one second distribution filter, current absolute position information of the mobile apparatus using the sensor information detected by the plurality of sensors;
- fusing, by a fusion filter, the relative position information of the plurality of first distribution filters and the absolute position information of the at least one second distribution filter to perform localization of the mobile apparatus; and
- generating, by the fusion filter, updated position/pose information of the mobile apparatus; and
- transmitting the updated position/pose information of the mobile apparatus to the plurality of first distribution filters;
- wherein the at least one second distribution filter is configured to generate the absolute position information through detection of at least one node predetermined on a space on which the mobile apparatus moves, and
- wherein the generating, by the plurality of first distribution filters, of the current relative position information of the mobile apparatus further comprises assimilating the updated position/pose information of the mobile apparatus from the fusion filter.

10. The localization method according to claim 9, wherein the at least one second distribution filter comprises:
- a predictor configured to predict position/pose information of the mobile apparatus; and
- an updater configured to update the predicted position/pose information of the mobile apparatus using the sensor information detected by the plurality of sensors;
- wherein the at least one second distribution filter is configured to provide the updated position/pose information to the fusion filter to reflect the updated position/pose information in update of position/pose information of the fusion filter.

11. The localization method according to claim 10, wherein prediction of the position/pose information is periodically performed, and
- wherein update of the position/pose information is performed once the at least one node is detected.

12. The localization method according to claim 10, wherein the plurality of first distribution filters are configured to reflect fused position/pose information of the fusion filter in update of the relative position information, and wherein the at least one second distribution filter is configured to reflect the fused position/pose information in update of the absolute position information.

13. The localization method according to claim 12, further comprising:
- recognizing, by a preprocessor, the at least one node predetermined on the space on which the mobile apparatus moves;
- generating, by the preprocessor, node detection information from which uncertainty of node detection is removed through comparison between a node recognition result and a predetermined local map; and
- providing, by the preprocessor, the node detection information to the at least one second distribution filter.

14. The localization method according to claim 13, wherein the preprocessing unit comprises:
- a node recognizer configured to recognize the at least one node; and
- a node matcher configured to remove the uncertainty of node detection.

15. The localization method according to claim 13, further comprising:
- storing the predetermined local map in a storage.

16. The localization method according to claim 9, wherein the plurality of sensors includes at least one camera configured to photograph the space on which the mobile apparatus moves.

17. The mobile apparatus according to claim 5, wherein the preprocessor is further configured to calculate measurement information to localize the mobile apparatus by performing preprocessing of detected information including image information transmitted from at least one camera.

18. The mobile apparatus according to claim 5, wherein the predetermined local map is uploaded via a wired, wireless, or wired-wireless hybrid network.

19. The mobile apparatus according to claim 8, wherein the at least one camera includes a charge-coupled device camera, complementary metal oxide semiconductor camera, or time-of-flight (TOF) camera.

20. The mobile apparatus according to claim 8, wherein the at least one camera includes a night vision camera configured to acquire images under no or little light condition.

21. The mobile apparatus according to claim 1, wherein the fusion filter is further configured to transmit the updated position/pose information to the each of the first distribution filters.

22. The mobile apparatus according to claim 1, wherein the fusion filter is further configured not to transmit the updated position/pose information back to the at least one second distribution filter.

* * * * *